US012362399B2

(12) United States Patent
Nakamura

(10) Patent No.: US 12,362,399 B2
(45) Date of Patent: *Jul. 15, 2025

(54) SECONDARY BATTERY, ELECTRONIC DEVICE, AND ELECTRIC TOOL

(71) Applicant: MURATA MANUFACTURING CO., LTD., Kyoto (JP)

(72) Inventor: Toshikazu Nakamura, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 507 days.

This patent is subject to a terminal disclaimer.

(21) Appl. No.: 17/949,605

(22) Filed: Sep. 21, 2022

(65) Prior Publication Data

US 2023/0029111 A1 Jan. 26, 2023

Related U.S. Application Data

(63) Continuation of application No. PCT/JP2021/009421, filed on Mar. 10, 2021.

(30) Foreign Application Priority Data

Mar. 23, 2020 (JP) ................................ 2020-050506

(51) Int. Cl.
*H01M 10/0587* (2010.01)
*H01M 4/02* (2006.01)
(Continued)

(52) U.S. Cl.
CPC ....... *H01M 10/0587* (2013.01); *H01M 4/483* (2013.01); *H01M 50/534* (2021.01);
(Continued)

(58) Field of Classification Search
CPC .................................................. H01M 50/538
See application file for complete search history.

(56) References Cited

U.S. PATENT DOCUMENTS

| | | | |
|---|---|---|---|
| 6,548,204 | B1 | 4/2003 | Kim et al. |
| 2002/0068217 | A1 | 6/2002 | Watanabe et al. |

(Continued)

FOREIGN PATENT DOCUMENTS

| | | | |
|---|---|---|---|
| JP | 2001185201 | A | 7/2001 |
| JP | 2002100364 | A | 4/2002 |

(Continued)

OTHER PUBLICATIONS

International Search Report of corresponding PCT application PCT/JP2021/009421, dated May 25, 2021.

*Primary Examiner* — Brian R Ohara
(74) *Attorney, Agent, or Firm* — K&L Gates LLP

(57) ABSTRACT

A secondary battery is provided including an electrode wound body housed in a battery can, with the electrode wound body having a structure including a band-shaped positive electrode and a band-shaped negative electrode laminated and wound with a separator interposed therebetween, where the positive electrode includes a positive electrode active material layer on both sides of a band-shaped positive electrode foil, the negative electrode includes a negative electrode active material layer on both sides of a band-shaped negative electrode foil, the electrode wound body includes a positive electrode tab at a central part of the positive electrode, includes a negative electrode tab on a winding end side of the negative electrode, and includes a foil tab in a flat plate shape on a winding start side of either one or both of the positive electrode and the negative electrode.

16 Claims, 18 Drawing Sheets

(51) Int. Cl.
*H01M 4/48* (2010.01)
*H01M 50/534* (2021.01)
*H01M 50/538* (2021.01)

(52) U.S. Cl.
CPC .... *H01M 50/538* (2021.01); *H01M 2004/027* (2013.01); *H01M 2220/30* (2013.01)

(56) References Cited

U.S. PATENT DOCUMENTS

| | | | | |
|---|---|---|---|---|
| 2005/0095505 | A1 | 5/2005 | Ohata et al. | |
| 2013/0316207 | A1 * | 11/2013 | Suwa .................. | H01M 50/534 429/94 |
| 2019/0097228 | A1 | 3/2019 | Kobayashi | |
| 2019/0312257 | A1 * | 10/2019 | Ishiwatari ............... | H01M 4/62 |
| 2021/0111465 | A1 | 4/2021 | Mizawa et al. | |

FOREIGN PATENT DOCUMENTS

| | | | | | |
|---|---|---|---|---|---|
| JP | 2002164044 | A | | 6/2002 | |
| JP | 2005135674 | A | | 5/2005 | |
| JP | 2006040772 | A | | 2/2006 | |
| JP | 2013025912 | A | | 2/2013 | |
| JP | 2014225326 | A | | 12/2014 | |
| KR | 20180113693 | A | * | 10/2018 | ........ H01M 10/0431 |
| WO | 2017163933 | A1 | | 9/2017 | |
| WO | 2018180748 | A1 | | 10/2018 | |

* cited by examiner

SECONDARY BATTERY, ELECTRONIC DEVICE, AND ELECTRIC TOOL

CROSS REFERENCE TO RELATED APPLICATIONS

The present application is a continuation of PCT patent application no. PCT/JP2021/009421, filed on Mar. 10, 2021, which claims priority to Japanese patent application no. JP2020-050506, filed on Mar. 23, 2020, the entire contents of which are herein incorporated by reference.

The present application relates to a secondary battery, an electronic device, and an electric tool.

Lithium ion batteries have been widely used in machines, tools, and the like, and structures that withstand repeated charge and discharge have been required. When discharge and charging are repeated, the inner peripheries of electrode wound bodies in battery cans may be deformed and buckled, thereby causing internal short circuits.

It has been disclosed, for example, that the strength of the inner periphery of an electrode wound body can be increased by disposing a reinforcing plate on the winding start side of a positive electrode and then winding the reinforcing plate together with a negative electrode and a separator.

SUMMARY

The present application relates to a secondary battery, an electronic device, and an electric tool.

However, when a positive electrode tab is welded to the reinforcing plate, the problem of being likely to cause an internal short circuit because of the formation of a large step at the inner periphery of the electrode wound body due to the thickness of the positive electrode tab. Also, when the thickness of the positive electrode tab is reduced for reducing the step of the inner periphery, the problem of generating heat in the case of discharging a relatively large current.

Accordingly, the present application relates to providing a battery that causes no buckling or internal short circuit if the battery is repeatedly charged and discharged according to an embodiment.

In order to solve the above-described problems, the present application provides, in an embodiment, a secondary battery including an electrode wound body housed in a battery can, with the electrode wound body having a structure including a band-shaped positive electrode and a band-shaped negative electrode laminated and wound with a separator interposed therebetween, where the positive electrode includes a positive electrode active material layer on both sides of a band-shaped positive electrode foil, the negative electrode includes a negative electrode active material layer on both sides of a band-shaped negative electrode foil, the electrode wound body includes a positive electrode tab at a central part of the positive electrode, includes a negative electrode tab on a winding end side of the negative electrode, and includes a foil tab in a flat plate shape on a winding start side of either one or both of the positive electrode and the negative electrode, the foil tab includes a plate-shaped part joined on the winding start side of the positive electrode or the negative electrode, and a comb-teeth part protruded from the positive electrode or the negative electrode, and the comb-teeth part is provided as connection of the electrode wound body.

According to an embodiment of the present application, a low-resistance battery can be provided without having any step at the inner periphery of the electrode wound body or causing any internal short circuit if the battery is repeatedly charged and discharged. It is to be noted that the contents of the present application are not to be construed as being limited by the effects illustrated in this specification.

DETAILED DESCRIPTION

Hereinafter, the present application will be described in further detail including with reference to the drawings according to an embodiment.

The present application is described herein including in reference to preferred specific examples according to an embodiment, and the contents of the present application are not to be considered limited thereto.

A cylindrical lithium ion battery will be described as an example of the secondary battery according to an embodiment. Any suitable battery other than the lithium ion battery or a battery that has any suitable shape other than the cylindrical shape may be used.

Figure 1:
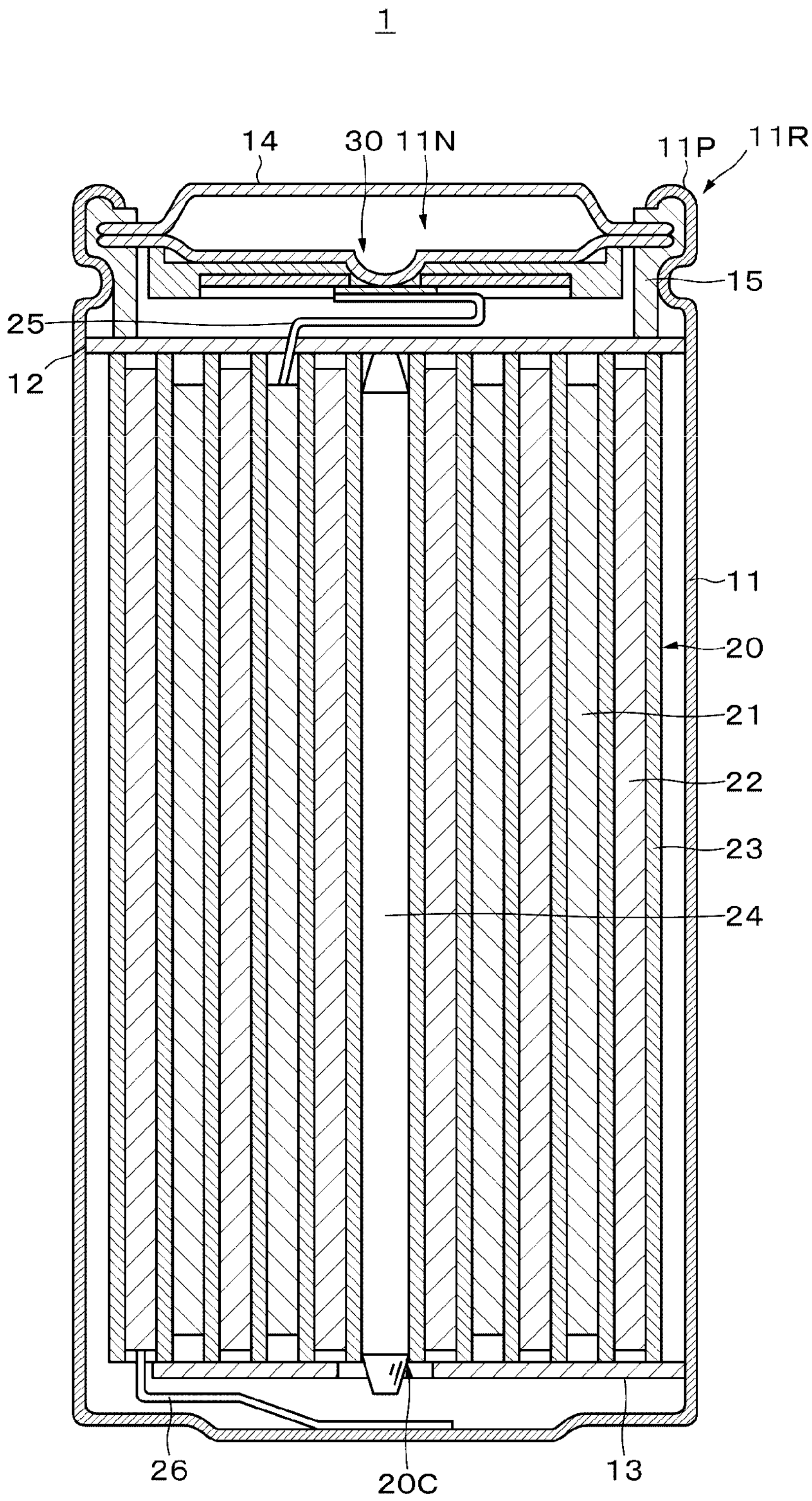
FIG. 1 is a schematic sectional view of a battery according to an embodiment.

First, the overall configuration of the lithium ion battery will be described according to an embodiment. FIG. 1 is a schematic sectional view of a lithium ion battery 1. The lithium ion battery 1 is, for example, a cylindrical lithium ion battery 1 that has an electrode wound body 20 is housed inside a battery can 11 as shown in FIG. 1.

For example, the lithium ion battery 1 includes a pair of insulating plates 12 and 13 and an electrode wound body 20 inside the cylindrical battery can 11. The lithium ion battery 1 may further include any one of, or two or more of a thermosensitive resistor (Positive Temperature Coefficient Thermal-Resistor or PTC), a reinforcing member, and the like inside the battery can 11.

The battery can 11 is a member that mainly houses the electrode wound body 20. The battery can 11 is a cylindrical container with one end thereof opened and the other end thereof closed. More specifically, the battery can 11 has an opened end (open end 11N). The battery can 11 contains any one of, or two or more of metal materials such as iron, aluminum, and alloys thereof. The surface of the battery can 11 may be, however, plated with any one of, or two or more of metal materials such as nickel.

The insulating plates 12 and 13 are sheet-shaped members that each have a surface substantially perpendicular to the winding axis direction (vertical direction in FIG. 1) of the electrode wound body 20. The insulating plates 12 and 13 are disposed so as to sandwich the electrode wound body 20 therebetween. As a material for the insulating plates 12 and 13, a polyethylene terephthalate (PET), a polypropylene (PP), bakelite, or the like is used. Examples of bakelite include paper bakelite and cloth bakelite produced by applying a phenolic resin to paper or cloth and then heating the paper or cloth.

At the open end 11N of the battery can 11, the battery cover 14 and the safety valve mechanism 30 are crimped at a bent part 11P with the gasket 15 to form a crimped structure 11R (crimped structure). Thus, with the electrode wound body 20 and the like housed inside the battery can 11, the battery can 11 is sealed.

The battery cover 14 is a member that closes the open end 11N of the battery can 11 with the electrode wound body 20 and the like housed inside the battery can 11. The battery cover 14 contains the same material as the material that forms the battery can 11. The central region of the battery cover 14 protrudes in the vertical direction in FIG. 1. In contrast, the region (peripheral region) of the battery cover 14 other than the central region has contact with the safety valve mechanism 30 with the PTC element 16 interposed therebetween.

The gasket 15 is a member mainly interposed between the bent part 11P of the battery can 11 (also referred to as a crimped part) and the battery cover 14 to seal the gap between the bent part 11P and the battery cover 14. For example, asphalt or the like may be applied to the surface of the gasket 15.

The gasket 15 contains an insulating material. The types of the insulating materials are not particularly limited, and may be a polymer material such as a polybutylene terephthalate (PBT) and a polypropylene (PP). This is because the gap between the bent part 11P and the battery cover 14 is sufficiently sealed while the battery can 11 and the battery cover 14 are electrically separated from each other.

The safety valve mechanism 30 mainly releases the sealed state of the battery can 11 to release the pressure (internal pressure) inside the battery can 11, if necessary, when the internal pressure is increased. The cause of the increase in the internal pressure of the battery can 11 is a gas generated due to a decomposition reaction of an electrolytic solution during charging or discharging.

For the cylindrical lithium ion battery, a band-shaped positive electrode 21 and a band-shaped negative electrode 22 are spirally wound with a separator 23 interposed therebetween, impregnated with an electrolytic solution, and housed in the battery can 11. Although not illustrated, the positive electrode 21 and the negative electrode 22 are obtained by respectively forming a positive electrode active material layer and a negative electrode active material layer on one side or both sides of a positive electrode foil and a negative electrode foil. The material of the positive electrode foil is a metal foil containing aluminum or an aluminum alloy. The material of the negative electrode foil is a metal foil containing nickel, a nickel alloy, copper, or a copper alloy. The separator 23 is a porous and insulating film, which enables transfer of lithium ions while electrically insulating the positive electrode 21 and the negative electrode 22.

The center of the electrode wound body 20 is provided with a space (central space 20C) produced when the positive electrode 21, the negative electrode 22, and the separator 23 are wound is provided, and a center pin 24 is inserted into the central space 20C (FIG. 1). The center pin 24 can be, however, omitted.

A positive electrode lead 25 is connected to the positive electrode 21, and a negative electrode lead 26 is connected to the negative electrode 22 (FIG. 1). The positive electrode lead 25 includes a conductive material such as aluminum. The positive electrode lead 25 is connected to the safety valve mechanism 30, and electrically connected to the battery cover 14 via the PTC element.

The negative electrode lead 26 includes a conductive material such as nickel. The negative electrode lead 26 is electrically connected to the battery can 11.

The respective detailed configurations and materials of the positive electrode 21, negative electrode 22, separator 23, and electrolytic solution will be described later.

The positive electrode active material layer includes at least a positive electrode material (positive electrode active material) capable of occluding and releasing lithium, and may further include a positive electrode binder, a positive electrode conductive agent, and the like. The positive electrode material is preferably a lithium-containing compound (for example, a lithium-containing composite oxide and a lithium-containing phosphate compound).

The lithium-containing composite oxide has, for example, a layered rock salt-type or spinel-type crystal structure. The lithium-containing phosphate compound has, for example, an olivine type crystal structure.

The positive electrode binder includes a synthetic rubber or a polymer compounds. The synthetic rubbers may be styrene-butadiene rubbers, fluorine rubbers, ethylene propylene diene, and the like. Examples of the polymer compounds include a polyvinylidene fluoride (PVdF) and a polyimide.

The positive electrode conductive agent may be a carbon material such as graphite, carbon black, acetylene black, or Ketjen black. The positive electrode conductive agent may be, however, a metal material and a conductive polymer.

The surface of the negative electrode foil is preferably roughened. This is because the adhesion of the negative electrode active material layer to the negative electrode foil is improved due to a so-called anchor effect. Examples of the roughening method include a method of forming fine particles with the use of an electrolytic method to provide the surface of the negative electrode foil with irregularities. Copper foil prepared by an electrolytic method is generally referred to as electrolytic copper foil.

The negative electrode active material layer includes at least a negative electrode material (negative electrode active material) capable of occluding and releasing lithium, and may further include a negative electrode binder, a negative electrode conductive agent, and the like.

The negative electrode material incudes, for example, a carbon material. This is because a high energy density can be stably achieved due to the very small change in crystal structure at the time of occlusion and release of lithium. In addition, the carbon materials also function as negative electrode conductive agents, thus improving the conductivity of the negative electrode active material layer.

The carbon materials may be, for example, graphitizable carbon, non-graphitizable carbon, graphite, low-crystallinity carbon, or amorphous carbon. The shape of the carbon materials has a fibrous, spherical, granular, or scaly shape.

The negative electrode material may include, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include a silicon oxide ($SiO_x$ ($0<x\leq 2$)), a silicon carbide (SiC) or an alloy of carbon and silicon, and a lithium titanate (LTO).

Further, for the purpose of increasing the capacity, the negative electrode material preferably contains a silicon-containing compound such as a silicon oxide or a silicon alloy, or a simple substance of silicon.

For example, the content of a silicon oxide included in the negative electrode active material layer is preferably 5 wt % or more and 20 wt % or less. This is because the effect of increasing the capacity fails to be obtained if the content is excessively low, whereas silicon will expand and then impair battery characteristics if the content is excessively high. It is to be noted that the same applies to the contents of the silicon alloy and of the simple substance of silicon.

In the lithium ion battery 1, when the open-circuit voltage (that is, the battery voltage) in a fully charged case is 4.25 V or higher, the release amount of lithium per unit mass is increased also with the use of the same positive electrode active material as compared with a case where the open-circuit voltage in the fully charged case is low. Thus, a high energy density is achieved.

The separator 23 is a porous membrane containing a resin, and may be a laminated film of two or more porous films. The resin may be a polypropylene and a polyethylene.

The separator 23 may include a resin layer on one or both surfaces of the porous membrane as a substrate layer. This is because the adhesion of the separator 23 to each of the positive electrode 21 and the negative electrode 22 is improved, thus keeping the electrode wound body 20 from warping.

The resin layer contains a resin such as PVdF. In the case of forming the resin layer, a solution in which a resin is dissolved in an organic solvent or the like is applied to the substrate layer, and then the substrate layer is dried. It is to be noted that after immersing the substrate layer in the solution, the substrate layer may be dried. The resin layer preferably includes inorganic particles or organic particles from the viewpoint of improving the heat resistance and the safety of the battery. The type of the inorganic particles is an aluminum oxide, an aluminum nitride, an aluminum hydroxide, a magnesium hydroxide, boehmite, talc, silica, mica, or the like. In place of the resin layer, a surface layer containing inorganic particles as a main component may be used, which is formed by a sputtering method, an atomic layer deposition (ALD) method, or the like.

The electrolytic solution includes a solvent and an electrolyte salt, and may further include an additive and the like, if necessary. The solvent is a nonaqueous solvent such as an organic solvent, or water. The electrolytic solution including a nonaqueous solvent is referred to as a nonaqueous electrolytic solution. The nonaqueous solvent may be a cyclic carbonate, a chain carbonate, a lactone, a chain carboxylate, a nitrile (mononitrile), or the like.

Typical examples of the electrolyte salt are lithium salts, but a salt other than lithium salts may be contained. The lithium salt may be lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), dilithium hexafluorosilicate ($Li_2SF_6$), and the like. These salts can also be used in mixture, above all, the use of $LiPF_6$ and $LiBF_4$ in mixture is preferred from the viewpoint of improving battery characteristics. The content of the electrolyte salt is not particularly limited, but preferably 0.3 mol/kg to 3 mol/kg with respect to the solvent.

Subsequently, a method for manufacturing the secondary battery will be described. First, in the case of preparing the positive electrode 21, a positive electrode active material, a positive electrode binder, and a positive electrode conductive agent are mixed to prepare a positive electrode combination. Subsequently, the positive electrode combination is dispersed in an organic solvent, thereby preparing a paste-like positive electrode combination slurry. Subsequently, the positive electrode combination slurry is applied to both sides of the positive electrode foil, and then dried, thereby forming the positive electrode active material layer. Subsequently, while heating the positive electrode active material layer, the positive electrode active material layer is subjected to compression molding with the use of a roll press machine to obtain the positive electrode 21.

Also in the case of preparing the negative electrode 22, the preparation is performed in accordance with the same procedure as that for the positive electrode 21 mentioned above.

Next, the positive electrode lead 25 and the negative electrode lead 26 are connected respectively to the positive electrode foil and the negative electrode foil with the use of a welding method. Subsequently, the positive electrode 21 and the negative electrode 22 are stacked with the separator 23 interposed therebetween, and then wound, and a fixing tape is attached to the outermost peripheral surface of the separator 23 to form the electrode wound body 20.

Subsequently, with the insulator in contact with a side of electrode wound body 20 where the negative electrode lead 26 is exposed, the electrode wound body 20 is housed inside the battery can 11, and the can bottom and the negative electrode lead 26 are connected with the use of a welding method. Next, an insulator is also placed on a side of the electrode wound body 20 where the positive electrode lead 25 is exposed, and one end of the positive electrode lead 25 is connected to the safety valve mechanism 30 with the use of a welding method.

Subsequently, the battery can 11 is processed with the use of a beading processing machine (grooving processing machine) to form a recess in the battery can 11. Subsequently, the electrolytic solution is injected into the inside of the battery can 11 to impregnate the electrode wound body 20. Subsequently, the battery cover 14 and the safety valve mechanism 30 are housed together with the gasket 15 inside the battery can 11.

Finally, as shown in FIG. 1, at the open end 11N of the battery can 11, the battery cover 14 and the safety valve mechanism 30 are crimped with the gasket 15 to form the crimped structure 11R.

EXAMPLES

The present application will be specifically described below with reference to examples of the short circuit occurrence rate and buckling occurrence rate after a low-temperature cycle test and a drop test, with the use of the battery 1 prepared in the manner mentioned above according to an embodiment. It is to be noted that the present application is not to be considered limited to the examples described below.

The battery was 18650 (diameter: 18 mm, length: 65 mm) in size, and 3000 mAh in rated capacity. The material of the positive electrode foil 21A was Al, and the thickness thereof was 0.015 mm. The material of the negative electrode foil 22A was Cu, and the thickness thereof was 0.015 mm. The separator 23 was made of a biaxially oriented polyethylene, and was 0.010 mm in thickness. In all of the examples and a comparative example, the negative electrode active material contains carbon and silicon. Specifically, in the negative electrode active material containing carbon as a main material, and the content of a silicon oxide was 5 wt % in Example 6, 20 wt % in Example 8, and 15 wt % in the other examples.

A positive electrode tab 52 presented below corresponds to the positive electrode lead 25 in FIG. 1, and a negative electrode tab 53 below corresponds to the negative electrode lead 26 in FIG. 1. The examples and the comparative examples have, in addition to the tabs 52, 53 and the like, foil tabs 31, 32 on the winding start side(s) of one or both of the positive electrode and negative electrode. The foil tab 32 of the negative electrode will be described below as an example.

Hereinafter, a region where the surface of the positive electrode foil 21A is coated with the positive electrode active material layer is referred to as a positive electrode active material covered part 21B, and an uncoated region is referred to as a positive electrode active material non-covered part 21C. In addition, a region where the surface of the negative electrode foil 22A is coated with the negative electrode active material layer is referred to as a negative electrode active material covered part 22B, and an uncoated region is referred to as a negative electrode active material non-covered part 22C.

Figure 2:
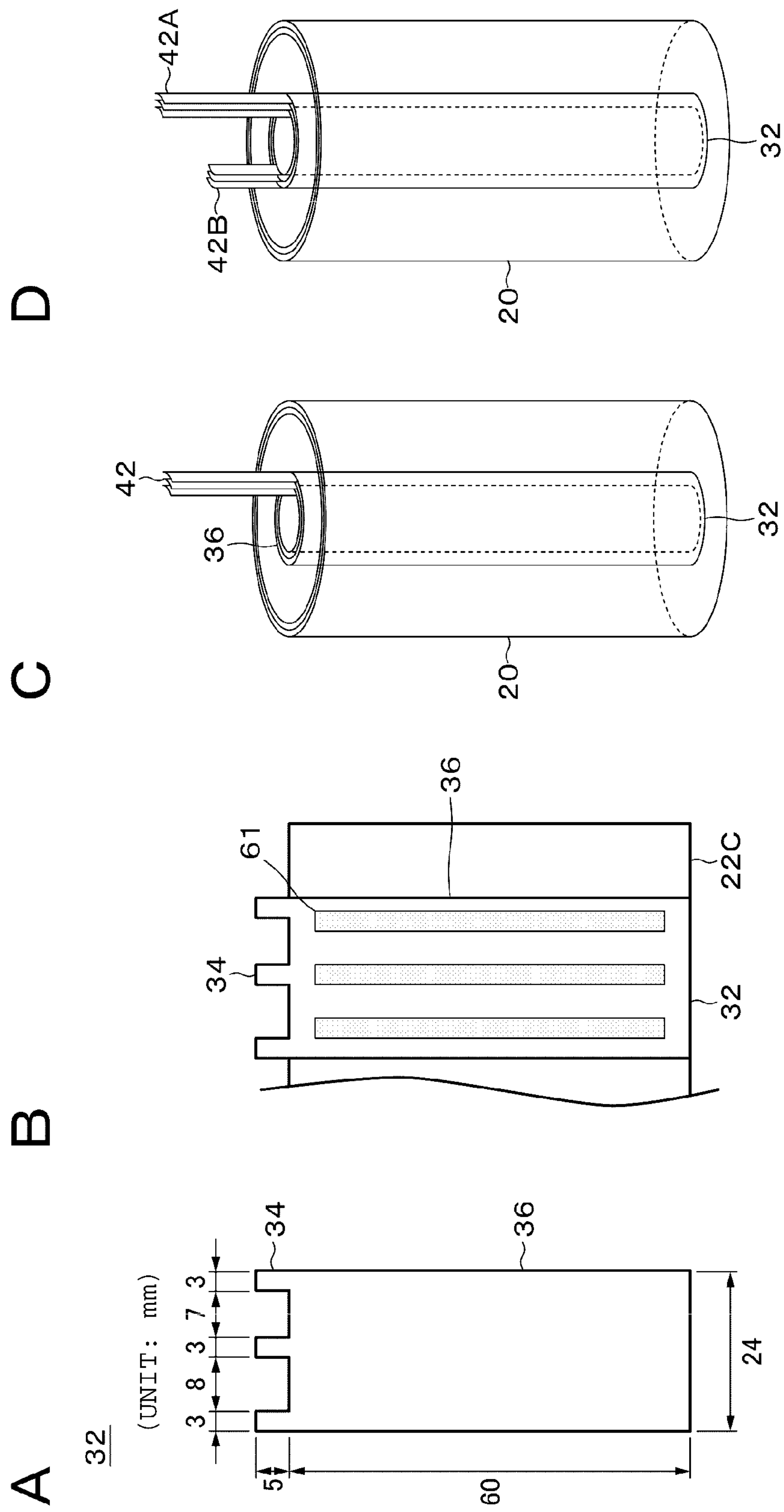
FIG. 2 is views A to D that are diagrams for illustrating an example of a foil tab.
Figure 3:
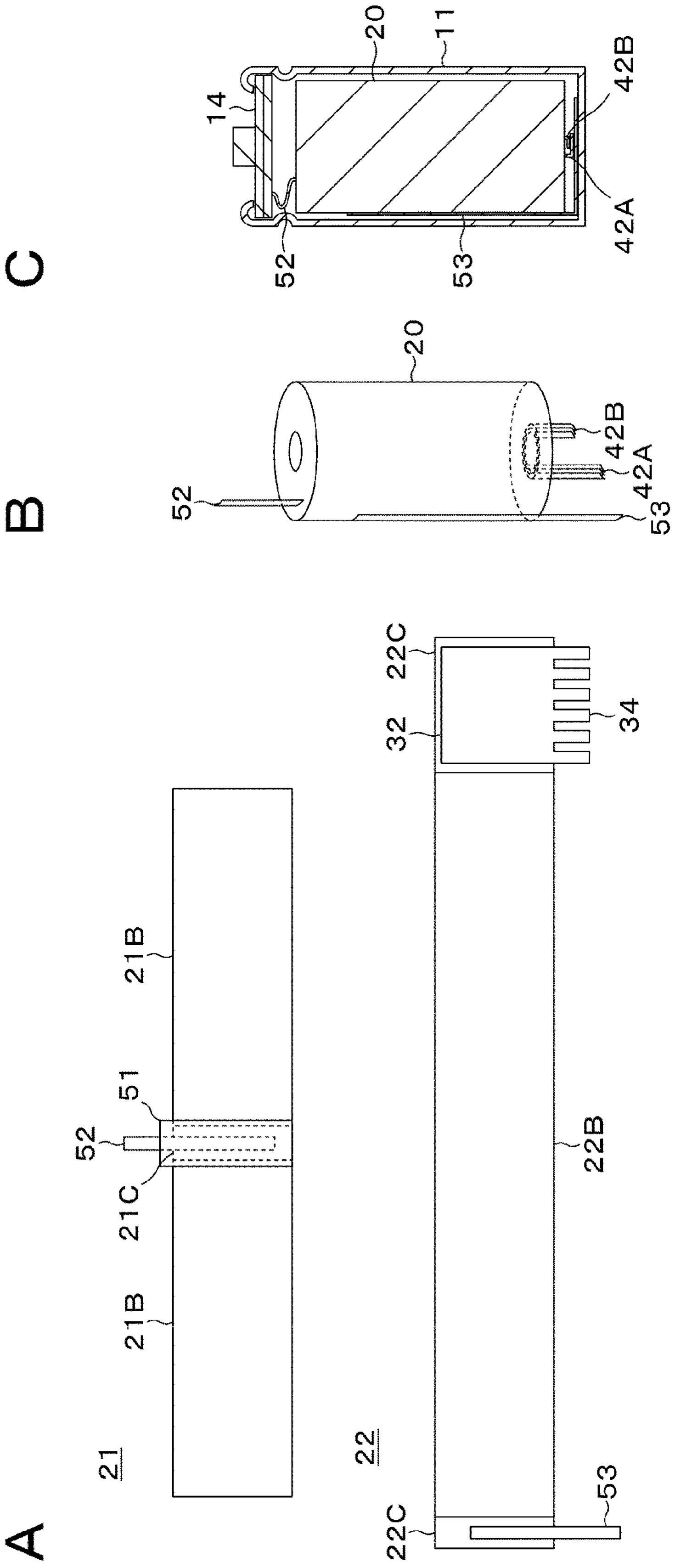
FIG. 3 is views A to C that are diagrams for illustrating Example 1.
Figure 4:
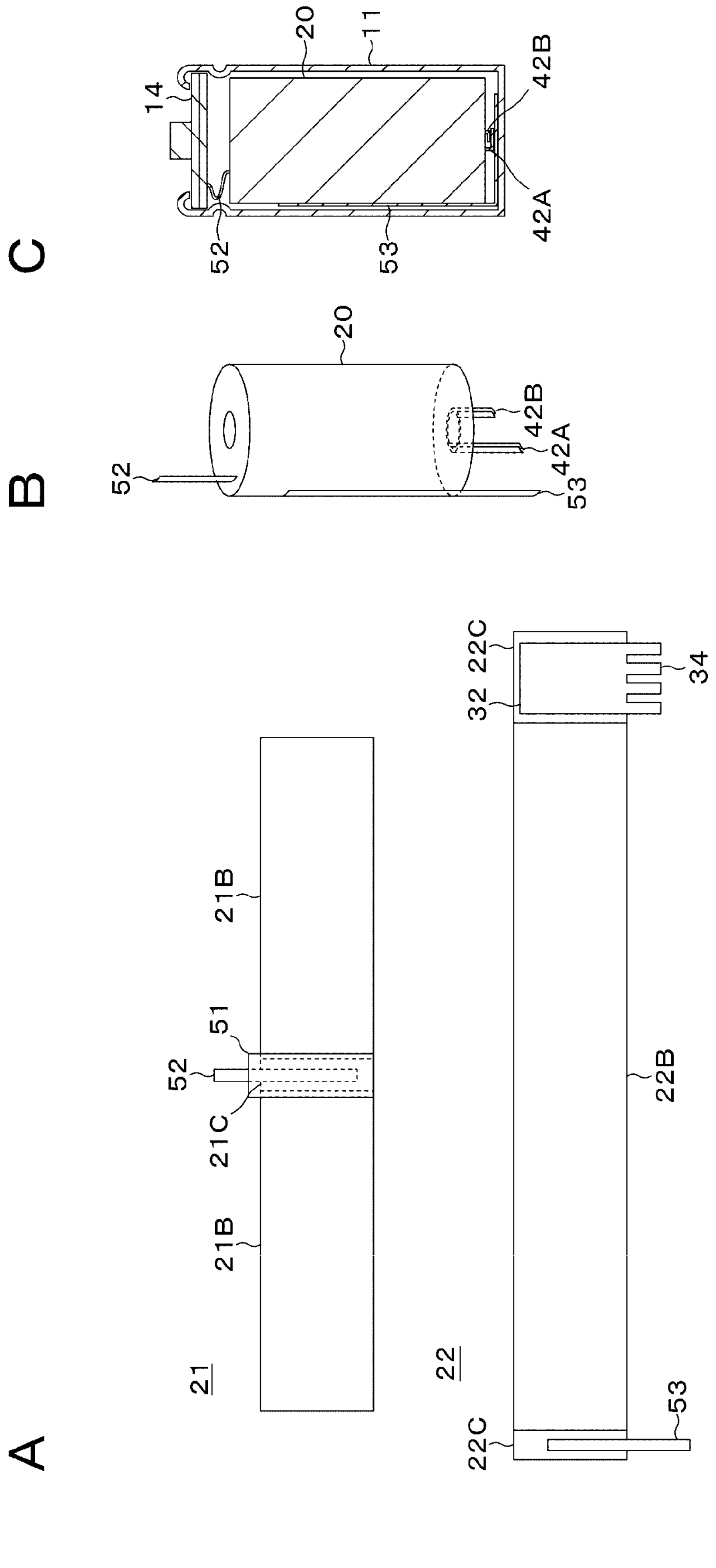
FIG. 4 is views A to C that are diagrams for illustrating Example 2.
Figure 5:
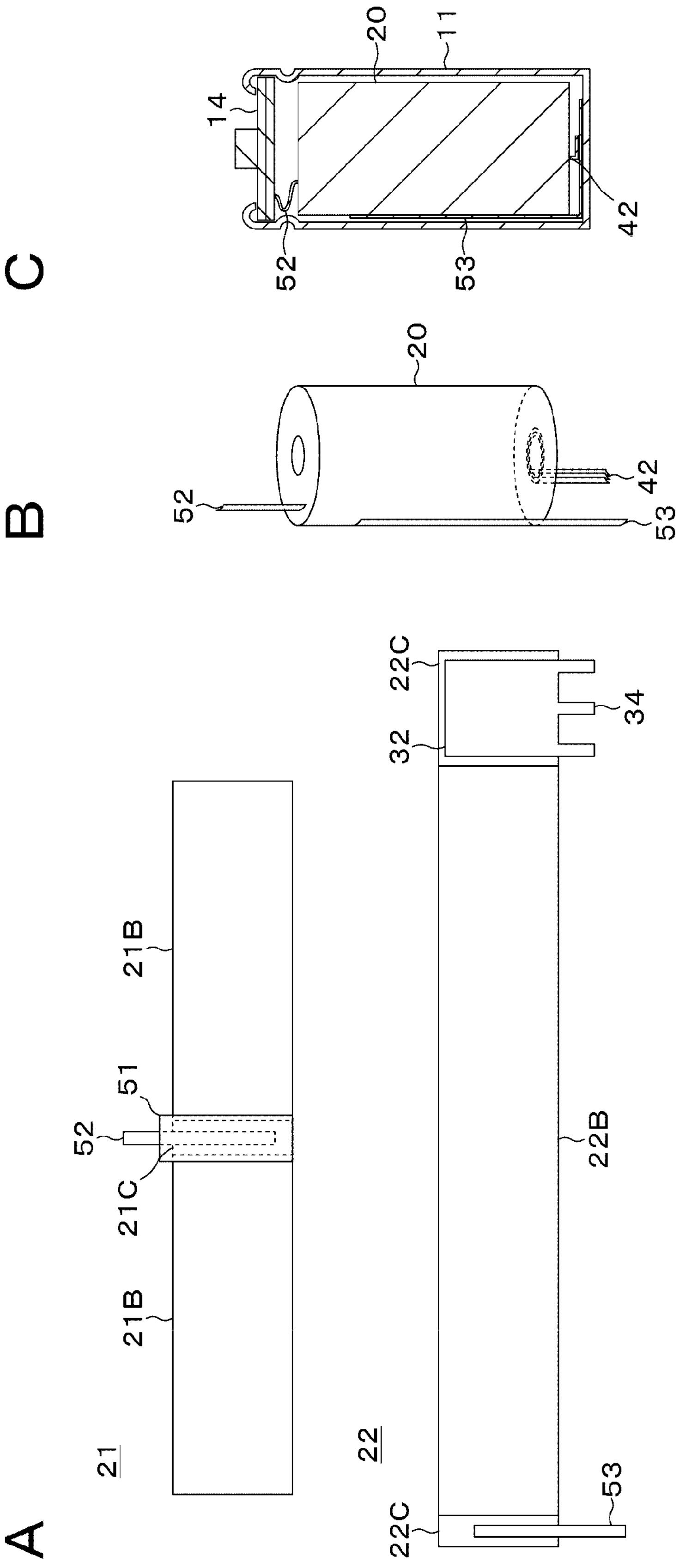
FIG. 5 is views A to C that are diagrams for illustrating Example 3.
Figure 6:
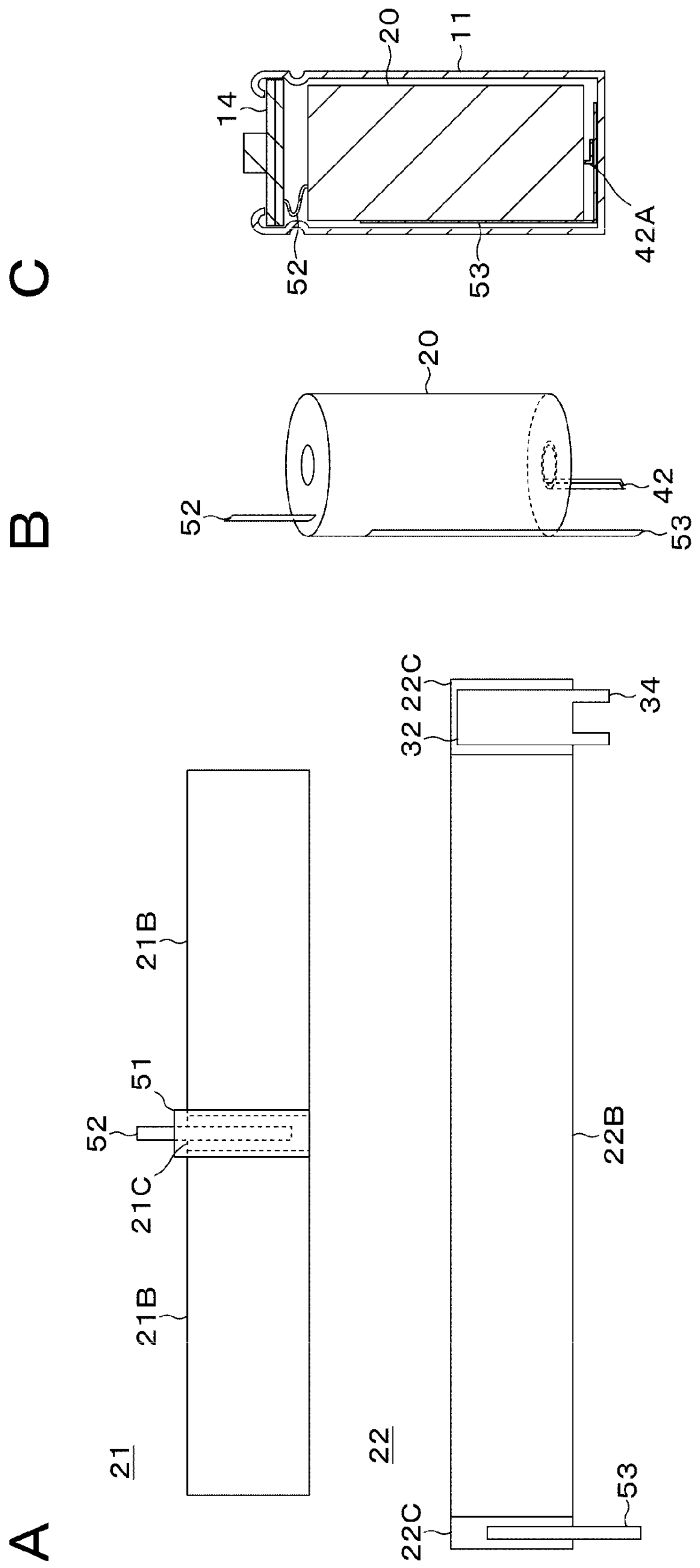
FIG. 6 is views A to C that are diagrams for illustrating Example 4.
Figure 7:
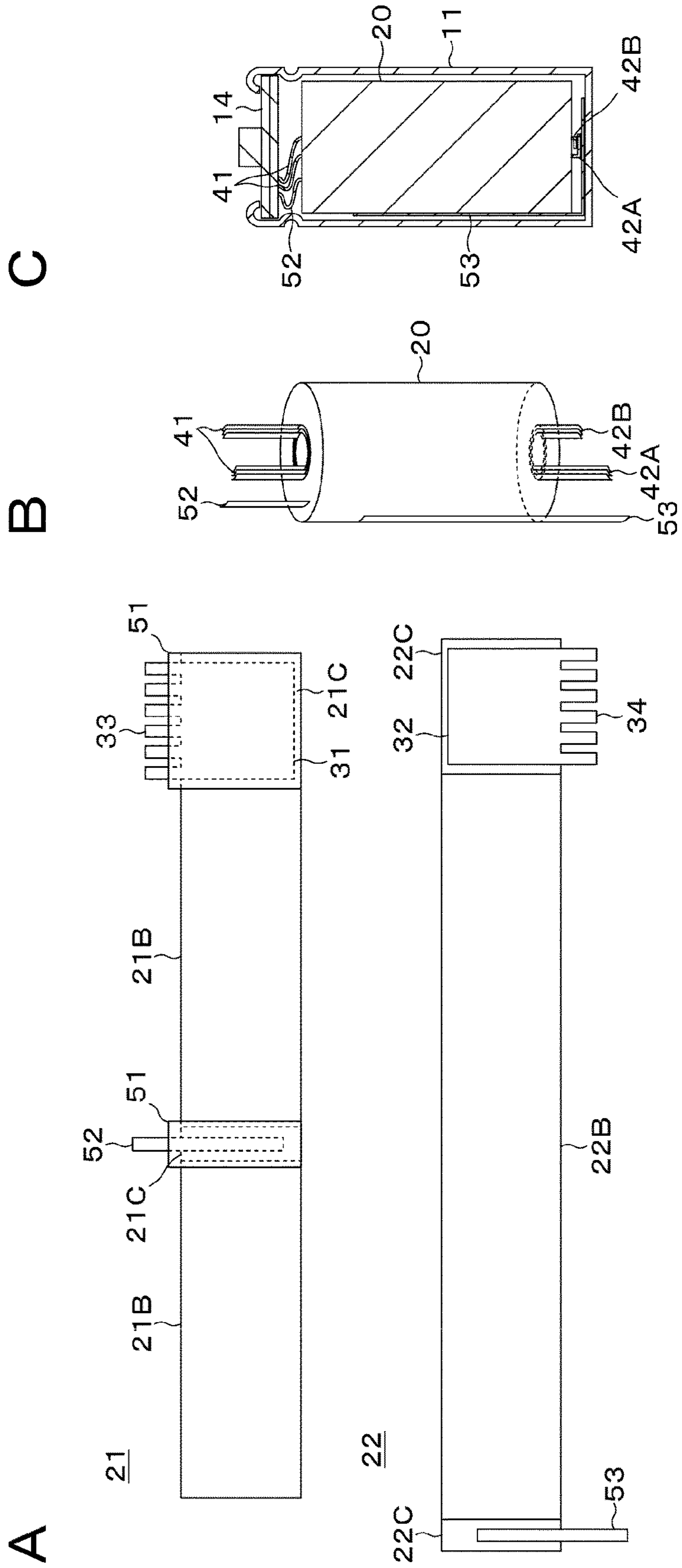
FIG. 7 is views A to C that are diagrams for illustrating Example 5.
Figure 8:
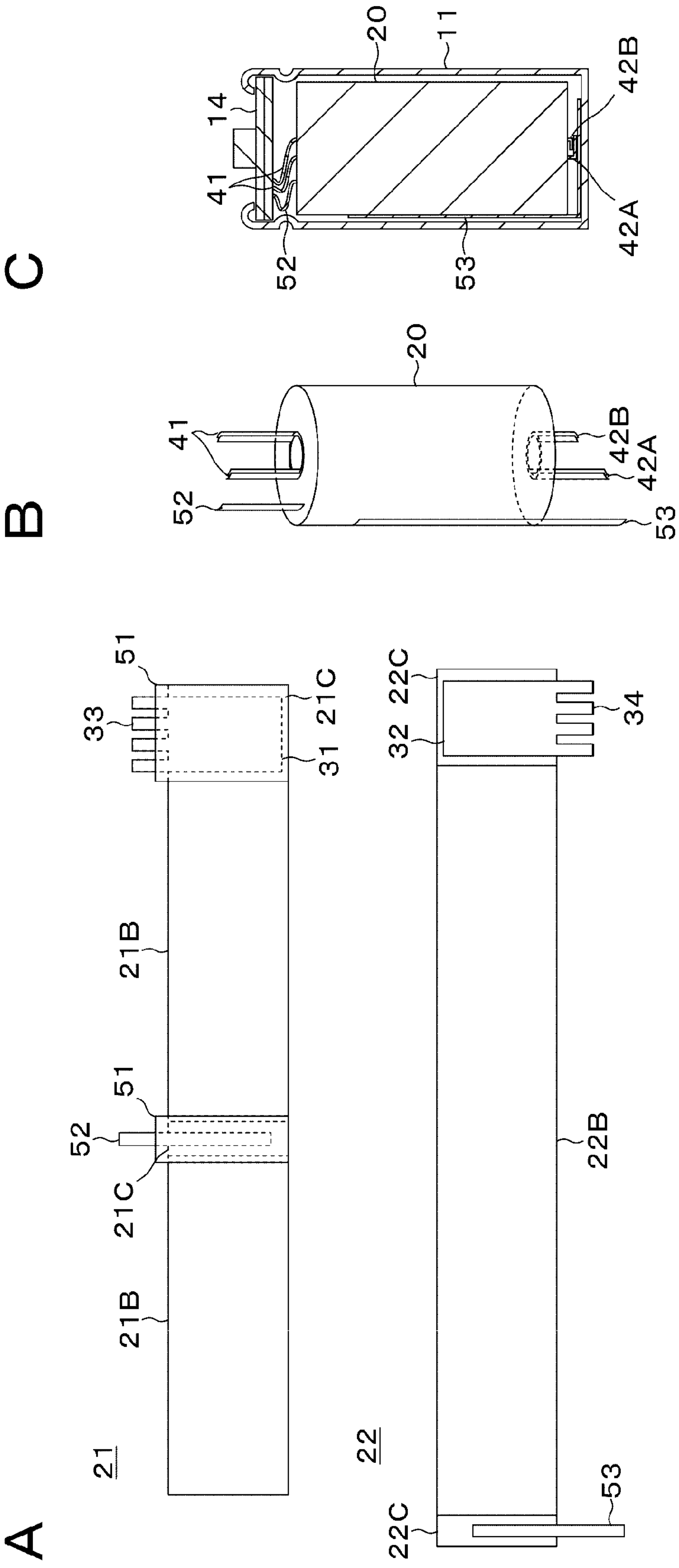
FIG. 8 is views A to C that are diagrams for illustrating Example 6.
Figure 9:
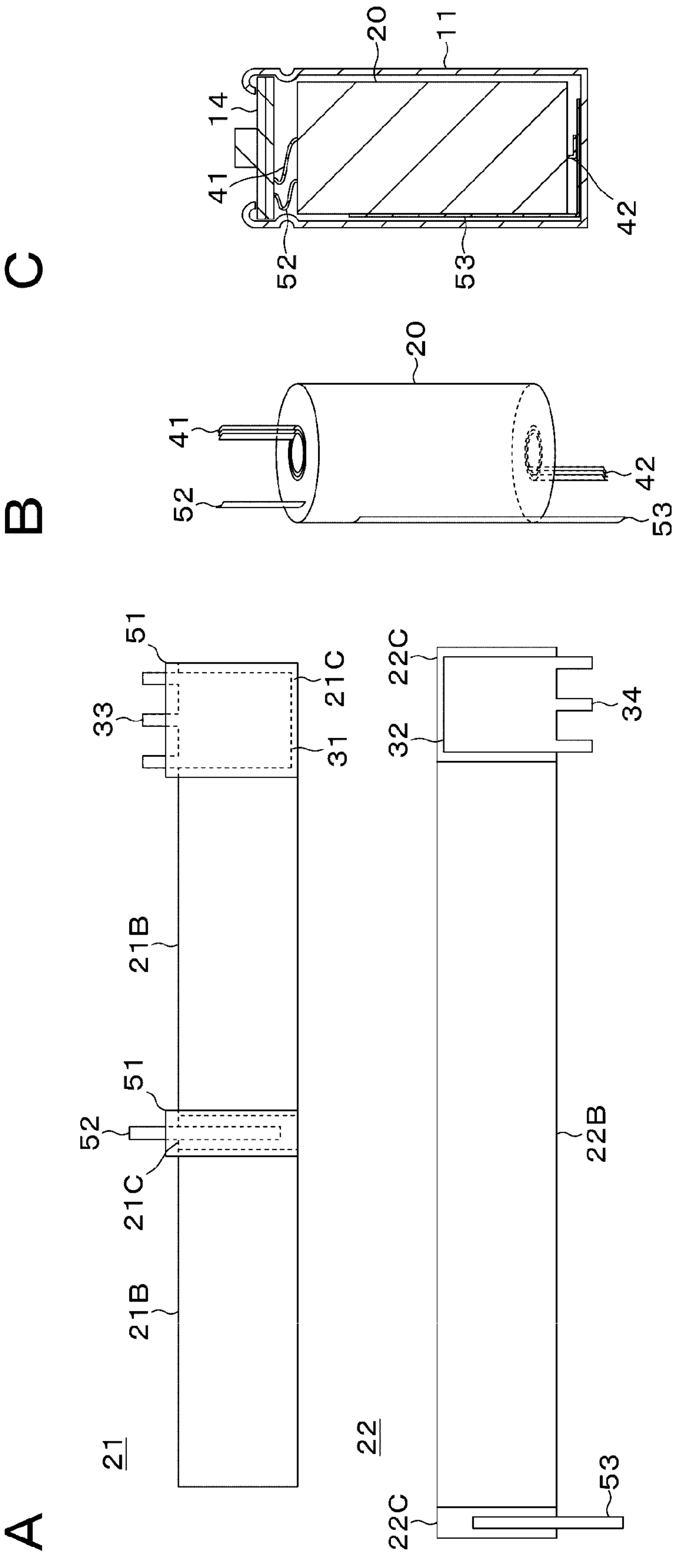
FIG. 9 is views A to C that are diagrams for illustrating Example 7.
Figure 10:
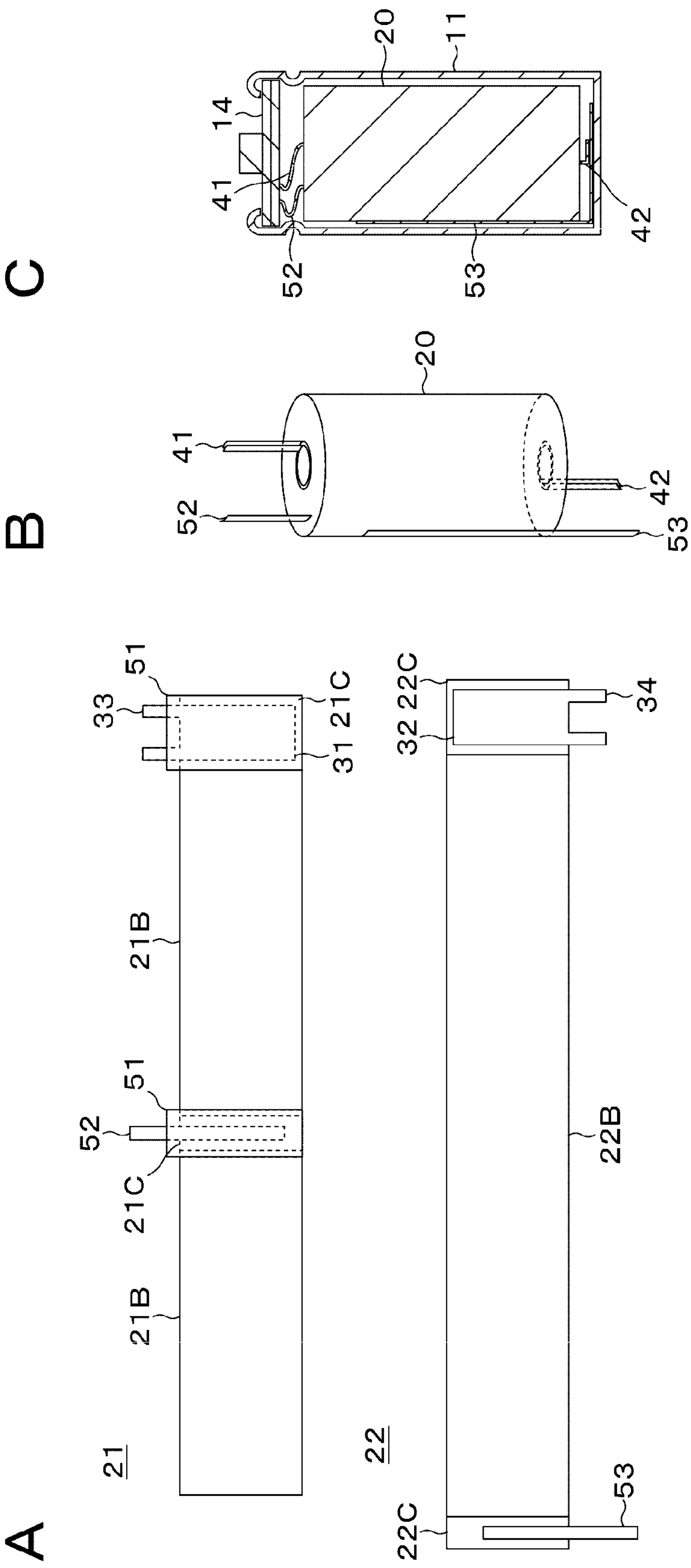
FIG. 10 is views A to C that are diagrams for illustrating Example 8.
Figure 11:
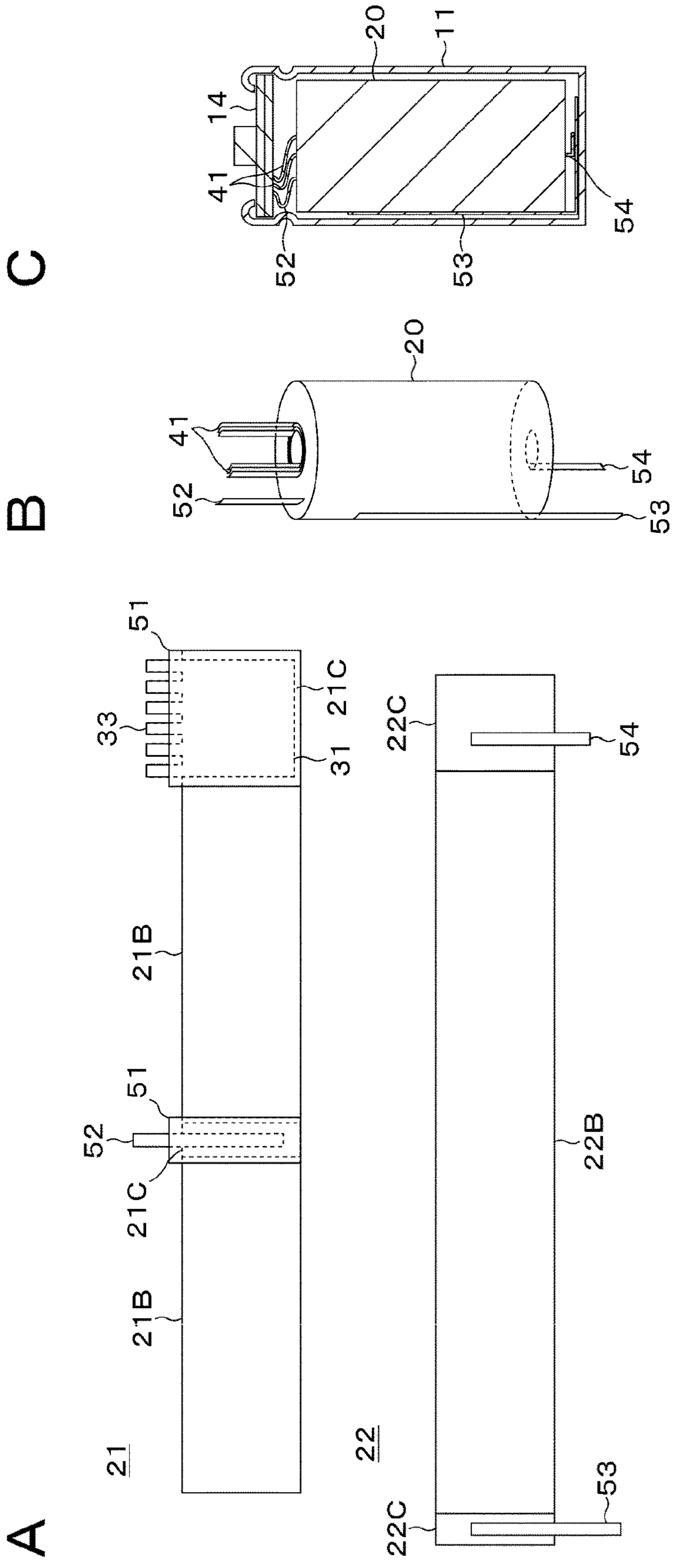
FIG. 11 is views A to C that are diagrams for illustrating Example 9.
Figure 12:
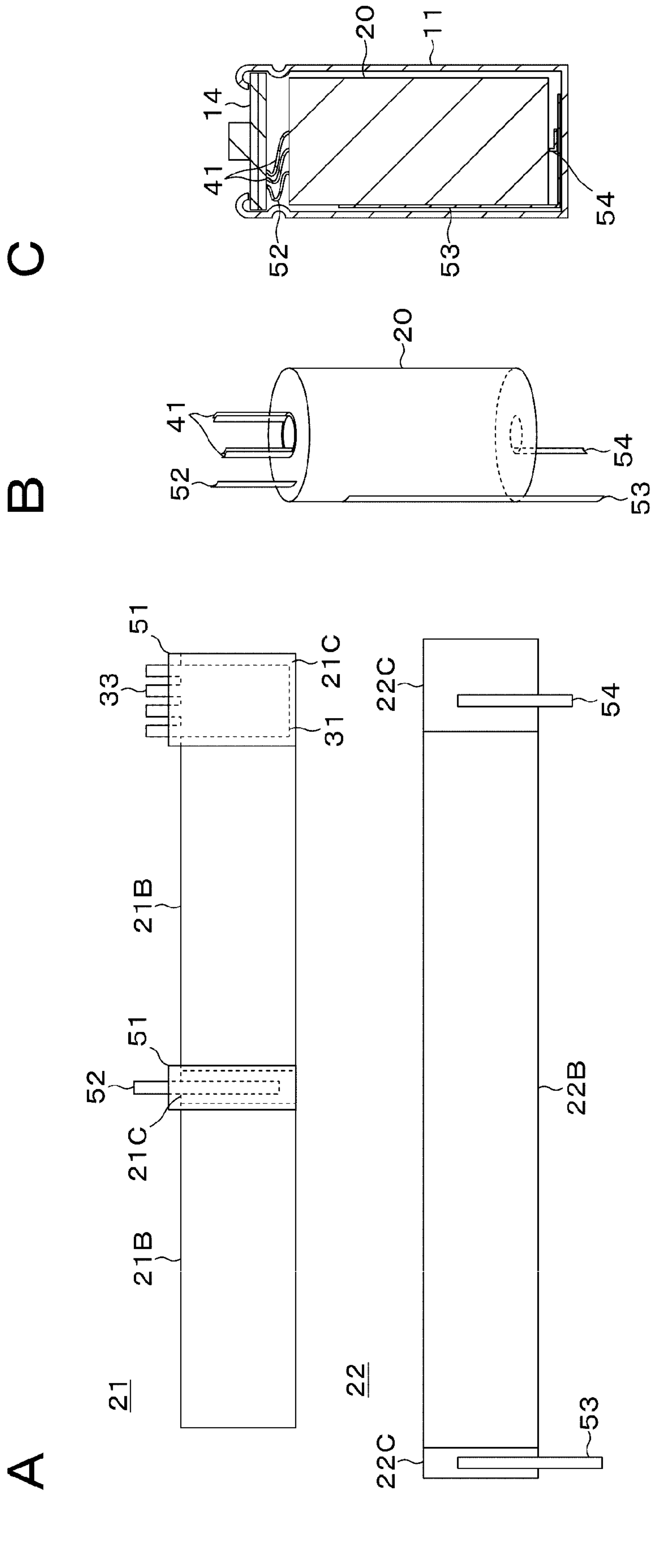
FIG. 12 is views A to C that are diagrams for illustrating Example 10.
Figure 13:
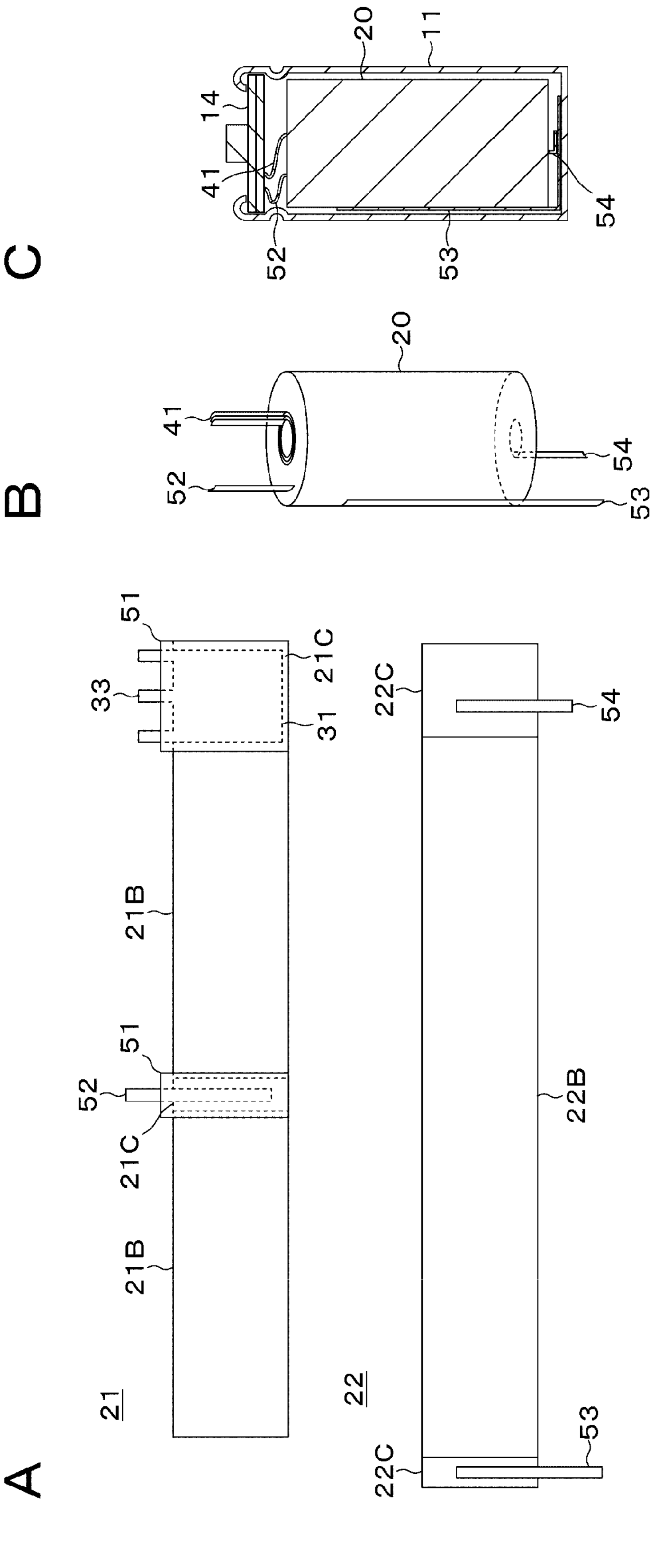
FIG. 13 is views A to C that are diagrams for illustrating Example 11.
Figure 14:
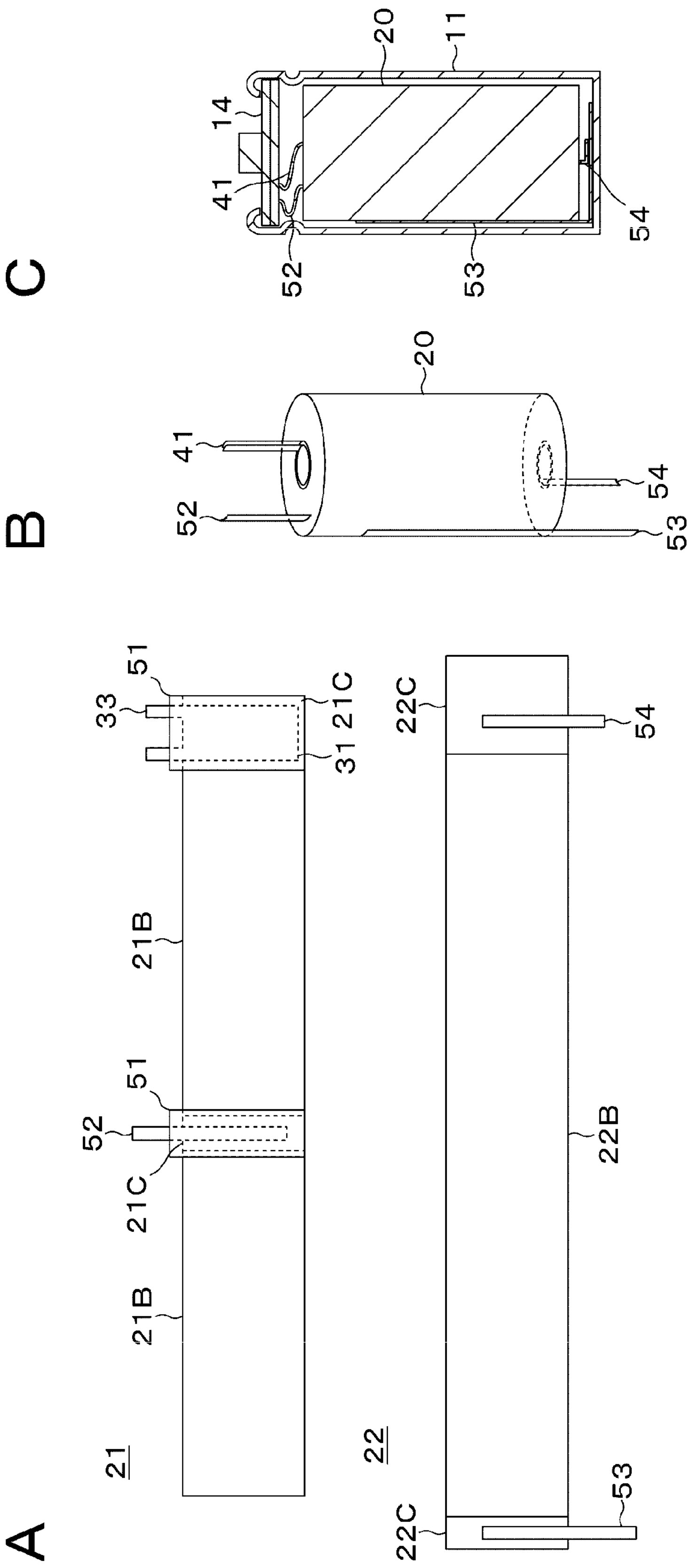
FIG. 14 is views A to C that are diagrams for illustrating Example 12.
Figure 15:
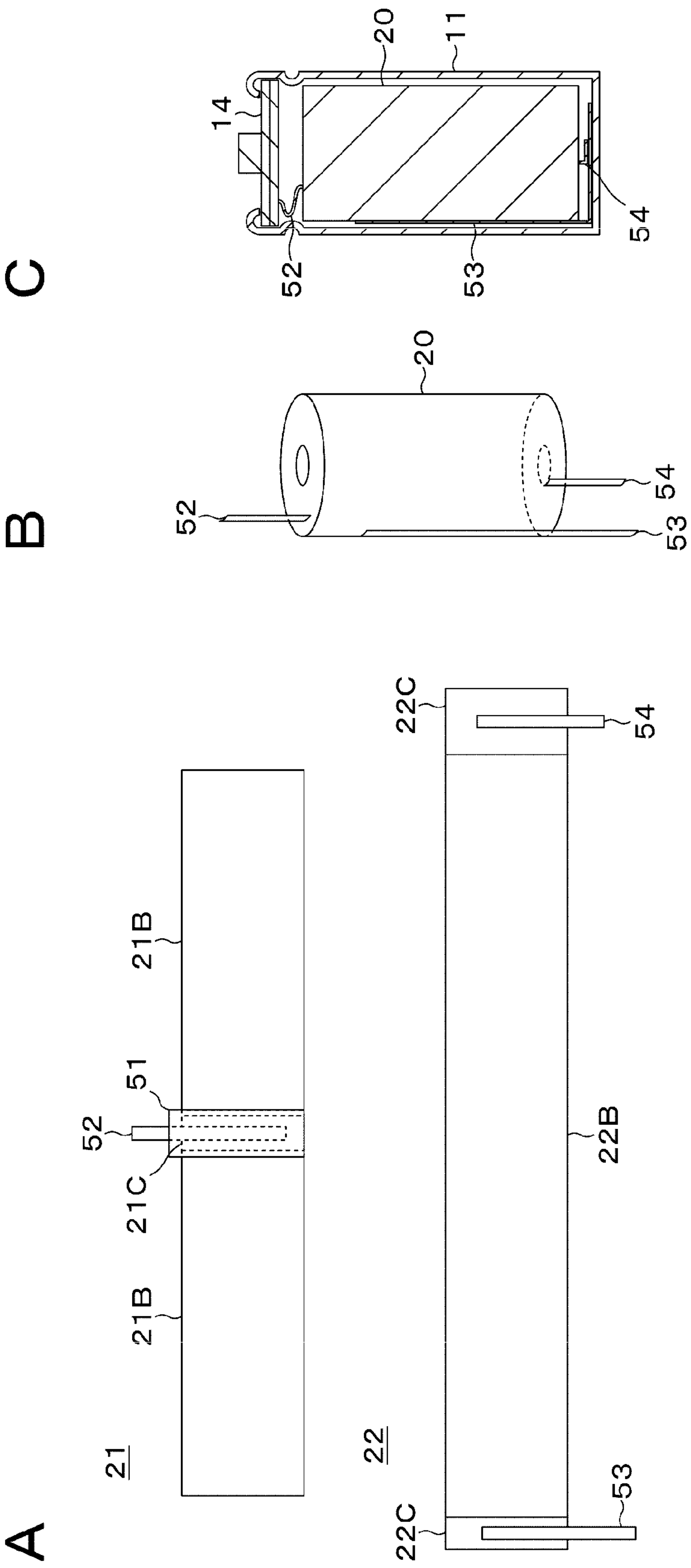
FIG. 15 is views A to C that are diagrams for illustrating Comparative Example 1.

The positive electrode 21 or the negative electrode 22 has a foil tab 31 for the positive electrode or a foil tab 32 for the negative electrode on the winding start side. For example, as shown in FIG. 2A, the foil tab 32 for the negative electrode has a flat plate shape, and includes a plate-shaped part 36 and a comb-teeth part 34. The plate-shaped part 36 of the foil tab 32 has a width of 24 mm, which is larger than that of a conventional tab, and serves as current collection from the negative electrode 22. The foil tab 32 has, at an end thereof, the comb-teeth part 34.

In FIG. 2A, the comb-teeth part 34 has a comb shape with one strip-shaped protrusion of 3 mm in width and of 5 mm in length. The intervals between the strip-shaped protrusions of the comb-teeth part 34 in FIG. 2A are 7 mm and 8 mm from the winding start side, which are not a constant value. The intervals between the strip-shaped protrusions of the comb-teeth part 34 are designed so as to be gradually increased from the winding start side, such that the widths of the strip-shaped protrusions (foil tab parts) overlapped one lap behind at the time of winding overlap within approximately ±1 mm, without any problem caused in welding to the can bottom and the safety valve. The intervals between the strip-shaped protrusions of the foil tab 32 are set so as to be gradually increased from the winding start side, such that the strip-shaped protrusions of the comb-teeth part 34 have one integrated shape when the foil tab 32 is wound. As shown in FIG. 2B, for example, the plate-shaped part 36 of the foil tab 32 of the negative electrode is joined to the negative electrode active material non-covered part 22C on the winding start side of the negative electrode 22 at three welded sites 61 (hatched parts in the drawing). In this regard, the foil tab 32 is disposed such that the comb-teeth part 34 protrudes from the negative electrode 22. It is to be noted that also in the case of the foil tab 31 for the positive electrode, the same configuration as that of the foil tab 32 for the negative electrode can be employed.

Examples of the material of the foil tab 31 for the positive electrode include aluminum, titanium, and stainless steel (SUS). SUS 304 is, after aging on heating, dissolved in a 4.2 V system with an LCO positive electrode or an NCA positive electrode used, but not dissolved in a 3.6 V system with a $LiFePO_4$ positive electrode or the like used. SUS 316 is, after aging on heating, also not dissolved in a 4.2 V system with an LCO positive electrode or an NCA positive electrode used. As described above, as for SUS, a material can be appropriately selected and then used depending on the battery voltage.

The foil tab 32 is wound together with the negative electrode 22, and as shown in FIG. 2C, the comb-teeth part 34 of the foil tab 32 is overlapped one lap behind and put together at one site, thereby providing one connection 42 of the foil tab 32. The connection 42 is joined to the can bottom of the battery can 11. The comb-teeth part 34 of the foil tab 32 in FIGS. 2A and 2B has three strip-shaped protrusions, the plate-shaped part 36 of the foil tab 32 is wound around two turns in FIG. 2C, and the connection 42 has a structure with three strip-shaped protrusions overlapped. The wound foil tab 32 serves as a reinforcing member for the inner periphery of the electrode wound body 20, and can prevent the inner periphery of the electrode wound body 20 from being buckled or deformed at the time of charging and discharging the battery 1.

The comb-teeth part of the foil tab 32 for the negative electrode may be divided into, for example, four, six, or more comb-teeth parts 34, and in such a case, as shown in FIG. 2D, when wound, the comb-teeth parts 34 of the foil tab 32 are put together and then overlapped at two sites to form two connections 42A and 42B facing each other. In this case, the comb-teeth parts 34 of the foil tab 32 for the negative electrode have relatively long strip-shaped protrusions and relatively short strip-shaped protrusions alternately arranged (not shown), and when wound, the long strip-shaped protrusions are overlapped with each other, whereas the short strip-shaped protrusions are overlapped with each other, thereby forming the relatively long connection 42A and the relatively short connection 42B for the foil tab 32 as in FIG. 2D. The lengths of the two connections 42A and 42B are changed, thereby allowing for folding and then welding to the can bottom.

The foil tab 31 for the positive electrode has the same shape as the foil tab 32 for the negative electrode, but differs therefrom in that the length of the comb-teeth part 33 is relatively large. Similarly, the comb-teeth part 33 protruded from the positive electrode 21 is wound together with the positive electrode 21 to form multiple strip-shaped protrusions into one or two connections 41. In the case of two connections 41, there is no particular difference in length between the two connections 41. The plate-shaped part 35 of the foil tab 31 is joined by welding at the positive electrode active material non-covered part 21C, which is the winding start side of the positive electrode. The wound foil tab 31 serves as a reinforcing member for the inner periphery of the electrode wound body 20, and can prevent the inner periphery of the electrode wound body 20 from being buckled or deformed at the time of charging and discharging the battery 1.

The foil tabs 31 and 32 are preferably 0.020 mm or more and 0.100 mm or less in thickness, because the foil tabs 31, 32 are required to have a thickness as a reinforcing material for the inner periphery of the electrode wound body 20, and because the battery can 11 is structurally restricted. More preferably, the foil tabs 31 and 32 are 0.030 mm or more and 0.080 mm or less in thickness. The material of the foil tab 32 for the negative electrode is preferably any of copper, a copper-nickel alloy, nickel, zinc, a copper-zinc alloy, and a copper-zinc-nickel alloy, or a composite material thereof. Furthermore, the number of turns of the foil tab 32 is preferably 1 turn or more and 4 turns or less.

The sectional area of the connection 41, 42, 42A or 42B of the foil tab 31 or 32 shown below is represented by the product of the width and thickness of the connection 41, 42, 42A, or 42B of the foil tab 31 or 32, and the sectional area of the tab 52, 53, or 54 is represented by the product of the width and thickness of the tab 52, 53, or 54. In all of the examples and Comparative Example 1, the width of the tab 52 at the intermediate position of the positive electrode 21 was set to be 6 mm, the thickness thereof was set to be 0.1 mm (0.6 $mm^2$ in sectional area), and the material thereof was Al. The positive electrode active material non-covered part 21C with the tab 52 and tab 52 joined at the central part of the positive electrode 21 was coated with an insulating tape 51. The thickness of the foil tab 31 on the winding start side of the positive electrode 21 was set to be 0.05 mm, the width of the strip-shaped protrusion of the comb-teeth part 33 was set to be 3 mm, and the material thereof was Al. The positive electrode active material non-covered part 21C with the foil tab 31 and foil tab 31 joined on the winding start side of the positive electrode 21 was coated with the insulating tape 51. The thickness of the tab 53 on the winding end side of the negative electrode 22 was set to be 0.08 mm, the width thereof was set to be 3 mm (0.24 $mm^2$ in sectional area), and the material thereof was CuNi.

Furthermore, in Examples 1 to 10, the thickness of the foil tab 32 on the winding start side of the negative electrode 22 was set to be 0.04 mm, the width of the strip-shaped protrusion of the comb-teeth part 34 was set to be 3 mm (one strip-shaped protrusion of the comb-teeth part 34 was 0.12 $mm^2$ in sectional area), and the material thereof was Cu. In Examples 11 to 14 and Comparative Example 1, the thickness of the tab 54 on the winding start side of the negative electrode 22 was set to be 0.08 mm, the width thereof was set to be 3 mm (0.24 $mm^2$ in sectional area), and the material thereof was CuNi.

The thicknesses of the tabs 52, 53, and 54 and the thicknesses of the foil tabs 31 and 32 were measured with the use of a micrometer (MDC-25 MX from Mitutoyo Corporation).

FIGS. 3A to 15A each (A for each of FIGS. 3 to 15) show a schematic view of the positive electrode 21 before winding on the upper side of each drawing, and show a schematic view of the negative electrode 22 before winding on the lower side of each drawing, where the right side of each drawing is regarded as the winding start side, whereas the left side of each drawing is regarded as the winding end side. FIGS. 3B to 15B each (B for each of FIGS. 3 to 15) show a schematic view of the electrode wound body 20 after winding the positive electrode 21 and the negative electrode 22 in FIGS. 3A to 15A together with the separator, where the upper side of each drawing is regarded as a side close to the battery cover 14, whereas the lower side of each drawing is regarded as a side close to the can bottom of the battery can 11. FIGS. 3C to 15C (C for each of FIGS. 3 to 15) are each a schematic view in the case of the battery 1 with the electrode wound body 20 in FIGS. 3B to 15B housed in the battery can 11, where details of the gasket 15 and the like are omitted.

Example 1

As shown in FIG. 3A, a tab 52 was disposed at an intermediate position of the positive electrode 21, a foil tab 32 was disposed on the winding start side of the negative electrode 22, and a tab 53 was disposed on the winding end side of the negative electrode 22. The comb-teeth part 34 of the foil tab 32 was composed of six strip-shaped protrusions. As shown in FIG. 3B, the positive electrode 21 and the negative electrode 22 were stacked with the separator 23 interposed therebetween, the six strip-shaped protrusions of the comb-teeth part 34 were overlapped every other protrusion, and then wound to be put together with the two connections 42A and 42B, the number of turns of the foil tab 32 for the negative electrode was set to be 2.5 turns, and the total sectional area of the connections 42A and 42B of the foil tab 32 for the negative electrode was set to be 0.72 $mm^2$. As shown in FIG. 3C, the electrode wound body 20 with the tabs 52 and 53 and the foil tab 32 joined was disposed in the battery can 11. The content of the silicon oxide included in the negative electrode active material was set to be 15 wt %.

Example 2

As shown in FIG. 4A, a tab 52 was disposed at an intermediate position of the positive electrode 21, a foil tab 32 was disposed on the winding start side of the negative electrode 22, and a tab 53 was disposed on the winding end side of the negative electrode 22. The comb-teeth part 34 of the foil tab 32 was composed of four strip-shaped protrusions. As shown in FIG. 4B, the positive electrode 21 and the negative electrode 22 were stacked with the separator 23 interposed therebetween, the four strip-shaped protrusions of the comb-teeth part 34 were overlapped every other protrusion, and then wound to be put together at the two connections 42A and 42B, the number of turns of the foil tab 32 for the negative electrode was set to be 1.5 turns, and the total sectional area of the connections 42A and 42B of the foil tab 32 for the negative electrode was set to be 0.48 $mm^2$. As shown in FIG. 4C, the electrode wound body 20 with the tabs 52 and 53 and the foil tab 32 joined was disposed in the battery can 11. The content of the silicon oxide included in the negative electrode active material was set to be 15 wt %.

Example 3

As shown in FIG. 5A, a tab 52 was disposed at an intermediate position of the positive electrode 21, a foil tab 32 was disposed on the winding start side of the negative electrode 22, and a tab 53 was disposed on the winding end side of the negative electrode 22. The comb-teeth part 34 of the foil tab 32 was composed of three strip-shaped protrusions. As shown in FIG. 5B, the positive electrode 21 and the negative electrode 22 were stacked with the separator 23 interposed therebetween, the three strip-shaped protrusions of the comb-teeth part 34 were overlapped into one, and then wound to be put together at the connection 42, the number of turns of the foil tab 32 for the negative electrode was set to be 2 turns, and the total sectional area of the connection 42 of the foil tab 32 for the negative electrode was set to be 0.36 $mm^2$. As shown in FIG. 5C, the electrode wound body 20 with the tabs 52 and 53 and the foil tab 32 joined was disposed in the battery can 11. The content of the silicon oxide included in the negative electrode active material was set to be 15 wt %.

Example 4

As shown in FIG. 6A, a tab 52 was disposed at an intermediate position of the positive electrode 21, a foil tab 32 was disposed on the winding start side of the negative electrode 22, and a tab 53 was disposed on the winding end side of the negative electrode 22. The comb-teeth part 34 of the foil tab 32 was composed of two strip-shaped protrusions. As shown in FIG. 6B, the positive electrode 21 and the negative electrode 22 were stacked with the separator 23 interposed therebetween, the two strip-shaped protrusions of the comb-teeth part 34 were overlapped into one, and then wound to be put together at the connection 42, the number of turns of the foil tab 32 for the negative electrode was set to be 1 turn, and the total sectional area of the connection 42 of the foil tab 32 for the negative electrode was set to be 0.24 $mm^2$. As shown in FIG. 6C, the electrode wound body 20 with the tabs 52 and 53 and the foil tab 32 joined was disposed in the battery can 11. The content of the silicon oxide included in the negative electrode active material was set to be 15 wt %.

Example 5

As shown in FIG. 7A, a tab 52 was disposed at an intermediate position of the positive electrode 21, and a foil tab 31 was disposed on the winding start side of the positive electrode 21. The comb-teeth part 33 of the foil tab 31 was composed of six strip-shaped protrusions. A foil tab 32 was disposed on the winding start side of the negative electrode 22, and a tab 53 was disposed on the winding end side of the negative electrode 22. The comb-teeth part 34 of the foil tab 32 was composed of six strip-shaped protrusions. As shown in FIG. 7B, the positive electrode 21 and the negative electrode 22 were stacked with the separator 23 interposed therebetween, the six strip-shaped protrusions of the comb-teeth parts 33 and 34 were overlapped every other protrusion for each of the foil tab 31 and foil tab 32, and then wound to be put together at the two connections 41 and 41 and the two connections 42A and 42B, the number of turns of the foil tab 31 for the positive electrode was set to be 2.5 turns, the total sectional area of the connections 41 of the foil tab 31 for the positive electrode was set to be 0.9 $mm^2$, the number of turns of the foil tab 32 for the negative electrode was set to be 2.5 turns, and the total sectional area of the connections 42A and 42B of the foil tab 32 for the negative electrode was set to be 0.72 $mm^2$. As shown in FIG. 7C, the electrode wound body 20 with the tabs 52 and 53 and the foil tabs 31 32 joined was disposed in the battery can 11. The content of the silicon oxide included in the negative electrode active material was set to be 15 wt %.

Example 6

As shown in FIG. 8A, a tab 52 was disposed at an intermediate position of the positive electrode 21, and a foil tab 31 was disposed on the winding start side of the positive electrode 21. The comb-teeth part 33 of the foil tab 31 was composed of four strip-shaped protrusions. A foil tab 32 was disposed on the winding start side of the negative electrode 22, and a tab 53 was disposed on the winding end side of the negative electrode 22. The comb-teeth part 34 of the foil tab 32 was composed of four strip-shaped protrusions. As shown in FIG. 8B, the positive electrode 21 and the negative electrode 22 were stacked with the separator 23 interposed therebetween, the four strip-shaped protrusions of the comb-teeth parts 33 and 34 were overlapped every other protrusion for each of the foil tab 31 and foil tab 32, and then wound to be put together at the two connections 41 and 41 and the two connections 42A and 42B, the number of turns of the foil tab 31 for the positive electrode was set to be 1.5 turns, the total sectional area of the connections 41 of the foil tab 31 for the positive electrode was set to be 0.6 $mm^2$, the number of turns of the foil tab 32 for the negative electrode was set to be 1.5 turns, and the total sectional area of the connections 42A and 42B of the foil tab 32 for the negative electrode was set to be 0.48 $mm^2$. As shown in FIG. 8C, the electrode wound body 20 with the tabs 52 and 53 and the foil tabs 31 32 joined was disposed in the battery can 11. The content of the silicon oxide included in the negative electrode active material was set to be 5 wt %.

Example 7

This example was provided in the same manner as in Example 6, except that the content of the silicon oxide included in the negative electrode active material was set to be 15 wt %.

Example 8

This example was provided in the same manner as in Example 6, except that the content of the silicon oxide included in the negative electrode active material was set to be 20 wt %.

Example 9

As shown in FIG. 9A, a tab 52 was disposed at an intermediate position of the positive electrode 21, and a foil tab 31 was disposed on the winding start side of the positive electrode 21. The comb-teeth part 33 of the foil tab 31 was composed of three strip-shaped protrusions. A foil tab 32 was disposed on the winding start side of the negative electrode 22, and a tab 53 was disposed on the winding end side of the negative electrode 22. The comb-teeth part 34 of the foil tab 32 was composed of three strip-shaped protrusions. As shown in FIG. 9B, the positive electrode 21 and the negative electrode 22 were stacked with the separator 23 interposed therebetween, the three strip-shaped protrusions of the comb-teeth parts 33 and 34 were overlapped into one for each of the foil tabs 31 and 32, and then wound to be put together at the connection 41 and the connection 42, the number of turns of the foil tab 31 for the positive electrode was set to be 2 turns, the total sectional area of the connection 41 of the foil tab 31 for the positive electrode was set to be 0.45 $mm^2$, the number of turns of the foil tab 32 for the negative electrode was set to be 2 turns, and the total sectional area of the connection 42 of the foil tab 32 for the negative electrode was set to be 0.36 $mm^2$. As shown in FIG. 9C, the electrode wound body 20 with the tabs 52 and 53 and the foil tabs 31 32 joined was disposed in the battery can 11. The content of the silicon oxide included in the negative electrode active material was set to be 15 wt %.

Example 10

As shown in FIG. 10A, a tab 52 was disposed at an intermediate position of the positive electrode 21, and a foil tab 31 was disposed on the winding start side of the positive electrode 21. The comb-teeth part 33 of the foil tab 31 was composed of two strip-shaped protrusions. A foil tab 32 was disposed on the winding start side of the negative electrode 22, and a tab 53 was disposed on the winding end side of the negative electrode 22. The comb-teeth part 34 of the foil tab 32 was composed of two strip-shaped protrusions. As shown in FIG. 10B, the positive electrode 21 and the negative electrode 22 were stacked with the separator 23 interposed therebetween, the two strip-shaped protrusions of the comb-teeth parts 33 and 34 were overlapped into one for each of the foil tab 31 and foil tab 32, and then wound to be put together at the connection 41 and the connection 42, the number of turns of the foil tab 31 for the positive electrode was set to be 1 turn, the total sectional area of the connection 41 of the foil tab 31 for the positive electrode was set to be 0.3 $mm^2$, the number of turns of the foil tab 32 for the negative electrode was set to be 1 turn, and the total sectional area of the connection 42 of the foil tab 32 for the negative electrode was set to be 0.24 $mm^2$. As shown in FIG. 10C, the electrode wound body 20 with the tabs 52 and 53 and the foil tabs 31 32 joined was disposed in the battery can 11. The content of the silicon oxide included in the negative electrode active material was set to be 15 wt %.

Example 11

As shown in FIG. 11A, a tab 52 was disposed at an intermediate position of the positive electrode 21, and a foil tab 31 was disposed on the winding start side of the positive electrode 21. The comb-teeth part 33 of the foil tab 31 was composed of six strip-shaped protrusions. A tab 54 was disposed on the winding start side of the negative electrode 22, and a tab 53 was disposed on the winding end side of the negative electrode 22. As shown in FIG. 11B, the positive electrode 21 and the negative electrode 22 were stacked with the separator 23 interposed therebetween, the six strip-shaped protrusions of the comb-teeth part 33 were overlapped every other protrusion for the foil tab 31, and then wound to be put together at the two connections 41 and 41, the number of turns of the foil tab 31 for the positive electrode 21 was set to be 2.5 turns, the total sectional area of the connections 41 of the foil tab 31 for the positive electrode was set to be 0.9 $mm^2$, and the sectional area of the negative electrode tab 54 was set to be 0.24 $mm^2$. As shown in FIG. 11C, the electrode wound body 20 with the tabs 52, 53, and 54 and the foil tab 31 joined was disposed in the battery can.

The content of the silicon oxide included in the negative electrode active material was set to be 15 wt %.

Example 12

As shown in FIG. 12A, a tab 52 was disposed at an intermediate position of the positive electrode 21, and a foil tab 31 was disposed on the winding start side of the positive electrode 21. The comb-teeth part 33 of the foil tab 31 was composed of four strip-shaped protrusions. A tab 54 was disposed on the winding start side of the negative electrode 22, and a tab 53 was disposed on the winding end side of the negative electrode 22. As shown in FIG. 12B, the positive electrode 21 and the negative electrode 22 were stacked with the separator 23 interposed therebetween, the four strip-shaped protrusions of the comb-teeth part 33 were overlapped every other protrusion for the foil tab 31, and then wound to be put together at the two connections 41 and 41, the number of turns of the foil tab 31 for the positive electrode was set to be 1.5 turns, the total sectional area of the connections 41 of the foil tab 31 for the positive electrode was set to be 0.6 $mm^2$, and the sectional area of the negative electrode tab 54 was set to be 0.24 $mm^2$. As shown in FIG. 12C, the electrode wound body 20 with the tabs 52, 53, and 54 and the foil tab 31 joined was disposed in the battery can 11.

The content of the silicon oxide included in the negative electrode active material was set to be 15 wt %.

Example 13

As shown in FIG. 13A, a tab 52 was disposed at an intermediate position of the positive electrode 21, and a foil tab 31 was disposed on the winding start side of the positive electrode 21. The comb-teeth part 33 of the foil tab 31 was composed of three strip-shaped protrusions. A tab 54 was disposed on the winding start side of the negative electrode 22, and a tab 53 was disposed on the winding end side of the negative electrode 22. As shown in FIG. 13B, the positive electrode 21 and the negative electrode 22 were stacked with the separator 23 interposed therebetween, the three strip-shaped protrusions of the comb-teeth part 33 were overlapped into one for the foil tab 31, and then wound to be put together at the connection 41, the number of turns of the foil tab 31 for the positive electrode was set to be 2 turns, the total sectional area of the connection 41 of the foil tab 31 for the positive electrode was set to be 0.45 $mm^2$, and the sectional area of the negative electrode tab 54 was set to be 0.24 $mm^2$. As shown in FIG. 13C, the electrode wound body 20 with the tabs 52, 53, and 54 and the foil tab 31 joined was disposed in the battery can 11. The content of the silicon oxide included in the negative electrode active material was set to be 15 wt %.

Example 14

As shown in FIG. 14A, a tab 52 was disposed at an intermediate position of the positive electrode 21, and a foil tab 31 was disposed on the winding start side of the positive electrode 21. The comb-teeth part 33 of the foil tab 31 was composed of two strip-shaped protrusions. A tab 54 was disposed on the winding start side of the negative electrode 22, and a tab 53 was disposed on the winding end side of the negative electrode 22. As shown in FIG. 14B, the positive electrode 21 and the negative electrode 22 were stacked with the separator 23 interposed therebetween, the two strip-shaped protrusions of the comb-teeth part 33 were overlapped into one for the foil tab 31, and then wound to be put together at the connection 41, the number of turns of the foil tab 31 for the positive electrode was set to be 1 turn, the total sectional area of the connection 41 of the foil tab 31 for the positive electrode was set to be 0.3 $mm^2$, and the sectional area of the negative electrode tab 54 was set to be 0.24 $mm^2$. As shown in FIG. 14C, the electrode wound body 20 with the tabs 52, 53, and 54 and the foil tab 31 joined was disposed in the battery can 11. The content of the silicon oxide included in the negative electrode active material was set to be 15 wt %.

Comparative Example 1

As shown in FIG. 15A, a tab 52 was disposed at an intermediate position of the positive electrode 21, a tab 54 was disposed on the winding start side of the negative electrode 22, and a tab 53 was disposed on the winding end side of the negative electrode 22. As shown in FIG. 15B, the positive electrode 21 and the negative electrode 22 were stacked with the separator 23 interposed therebetween, and wound, and the sectional area of the negative electrode tab 54 was set to be 0.24 $mm^2$.

As shown in FIG. 15C, the electrode wound body 20 with the tabs 52, 53, and 54 joined was disposed in the battery can 11. The content of the silicon oxide included in the negative electrode active material was set to be 15 wt %.

For the batteries 1 according to the examples mentioned above, the internal resistances of the batteries were determined, the short circuit occurrence rates were obtained by performing a drop test after a low-temperature cycle test, the buckling occurrence rates were obtained by CT imaging, and from these results, comprehensive evaluations were made. The internal resistances of the batteries, the low-temperature cycle test, the drop test, and the CT imaging are as follows.

<Internal Resistance of Battery>

The internal resistances of the batteries were determined from the results of alternate-current impedance measurement at a frequency of 1 kHz.

<Low Temperature Cycle Test>

Environmental Temperature: 0° C.

Charge: CC/CV, 4.25 V/1 C, 100 mA cut Discharge: 2 C, 2 V cut (charge was resumed when the cell temperature reached 0° C. after discharge)

Number of Cycles: the number of cycles finally continued at a low rate (0.5 C) until the capacity retention ratio reached 30%, by reducing the discharge rate stepwise on the basis of reaching a capacity retention ratio of 30%.

When the retention ratio with respect to the initial discharge capacity reached 30% or less, the discharge rate was reduced to 1 C, and likewise, when the retention ratio reached 30% or less, the discharge rate was reduced to 0.5 C, and the test was performed down to 30% or less.

<Drop Test>

Some modifications were made to the "Guidelines for Evaluation Criteria for Safety of Lithium Secondary Batteries" (SBA G1101). Specifically, the drop test specified in the SBA G1101 is a test of dropping 10 times from a height of 1.9 m onto concrete, but in the drop test of this evaluation, the number of times for the dropping was set to 20 times, and the short circuit occurrence probability at n=10 was determined.

<CT Imaging>

After the drop test after the low-temperature cycle, the inner periphery of the electrode wound body was observed with the use of an X-ray CT imaging apparatus, and the proportion of batteries that caused buckling was regarded as the buckling occurrence rate. The number of tests was 10.

TABLE 1

| | | Winding Start Side of Positive Electrode | | | | Winding Start Side of Negative Electrode | |
|---|---|---|---|---|---|---|---|
| | Content of Silicon Oxide in Negative Electrode Active Material (%) | The Number of Strip-shaped Protrusions of Foil Tab | The Number of Connections of Foil Tab | The Number of Turns of Foil Tab (turns) | Total Sectional Area of Connection of Foil Tab ($mm^2$) | The Number of Strip-shaped Protrusions of Foil Tab or The Number of Tabs | The Number of Connections of Foil Tab or The Number of Tabs |
| Example 1 | 15 | — | — | — | — | 6 | 2 |
| Example 2 | 15 | — | — | — | — | 4 | 2 |
| Example 3 | 15 | — | — | — | — | 3 | 1 |
| Example 4 | 15 | — | — | — | — | 2 | 1 |
| Example 5 | 15 | 6 | 2 | 2.5 | 0.9 | 6 | 2 |
| Example 6 | 5 | 4 | 2 | 1.5 | 0.6 | 4 | 2 |
| Example 7 | 15 | 4 | 2 | 1.5 | 0.6 | 4 | 2 |
| Example 8 | 20 | 4 | 2 | 1.5 | 0.6 | 4 | 2 |
| Example 9 | 15 | 3 | 1 | 2 | 0.45 | 3 | 1 |
| Example 10 | 15 | 2 | 1 | 1 | 0.3 | 2 | 1 |
| Example 11 | 15 | 6 | 2 | 2.5 | 0.9 | 1 | 1 |
| Example 12 | 15 | 4 | 2 | 1.5 | 0.6 | 1 | 1 |
| Example 13 | 15 | 3 | 1 | 2 | 0.45 | 1 | 1 |
| Example 14 | 15 | 2 | 1 | 1 | 0.3 | 1 | 1 |
| Comparative Example 1 | 15 | — | — | — | — | 1 | 1 |

| | Winding Start Side of Negative Electrode | | | | | |
|---|---|---|---|---|---|---|
| | The Number of Turns of Foil Tab (turns) | Total Sectional Area of Connection of Foil Tab or Sectional Area of Tab ($mm^2$) | Internal Resistance ACR of Battery (mΩ) | Short Circuit Occurrence Rate (%) | Buckling Occurrence Rate (%) | Comprehensive Evaluation |
| Example 1 | 2.5 | 0.72 | 11.0 | 0 | 0 | OK |
| Example 2 | 1.5 | 0.48 | 11.1 | 0 | 0 | OK |
| Example 3 | 2 | 0.36 | 11.1 | 0 | 0 | OK |
| Example 4 | 1 | 0.24 | 11.2 | 0 | 0 | OK |
| Example 5 | 2.5 | 0.72 | 11.0 | 0 | 0 | OK |
| Example 6 | 1.5 | 0.48 | 11.1 | 0 | 0 | OK |
| Example 7 | 1.5 | 0.48 | 11.1 | 0 | 0 | OK |
| Example 8 | 1.5 | 0.48 | 11.1 | 0 | 0 | OK |
| Example 9 | 2 | 0.36 | 11.1 | 0 | 0 | OK |
| Example 10 | 1 | 0.24 | 11.2 | 0 | 0 | OK |
| Example 11 | — | 0.24 | 12 | 0 | 0 | OK |

TABLE 1-continued

| | | | | | | |
|---|---|---|---|---|---|---|
| Example 12 | — | 0.24 | 12 | 0 | 0 | OK |
| Example 13 | — | 0.24 | 12 | 0 | 0 | OK |
| Example 14 | — | 0.24 | 12 | 0 | 0 | OK |
| Comparative Example 1 | — | 0.24 | 12 | 50 | 100 | NG |

The comprehensive evaluation was OK because of the short circuit occurrence rate and buckling occurrence rate of 0% in Examples 1 to 14, whereas the comprehensive evaluation was NG because of the high values of the rates in Comparative Example 1. It has been determined that the comprehensive evaluation is OK with the foil tabs 31 and/or 32 provided on the winding start side(s) of either one or both of the positive electrode 21 and negative electrode 22. The inner periphery of the electrode wound body was kept in a perfect circle without being distorted in Examples 1 to 14, whereas the inner periphery of the electrode wound body was distorted is distorted without being kept in a perfect circle in Comparative Example 1. The content of the silicon oxide for the comprehensive evaluation of OK was 5 wt % or more and 20 wt % or less. From Table 1, it has been found that the battery 1 causes no buckling or internal short circuit if the battery 1 is repeatedly charged and discharged, when: the battery 1 has the foil tabs 31 and/or 32 with the comb-teeth parts 33 and/or 34 on the winding start side(s) of either one or both of the positive electrode 21 and negative electrode 22; the comb-teeth parts 33 and 34 protrude from the positive electrode 21 or the negative electrode 22; and the strip-shaped protrusions of the comb-teeth parts 33 and 34 are overlapped and then put together as one or more connections 41, 42, 42A, and 42B for the foil tabs 31 and 32.

While the present application has been described herein, the contents of the present application are not to be considered limited thereto, and it is possible and contemplated that various modifications can be made thereof.

For example, the size of the battery 1 was 18650 (diameter: 18 mm, height: 65 mm), but may be any other size. The rated capacity of the battery 1 was 3000 mAh, but may have any other value. The thicknesses of the positive electrode foil 21A, negative electrode foil 22 A, and separator 23 are not required to have the values described above. The numbers of the strip-shaped protrusions of the comb-teeth parts 33 and 34 are not limited to the examples, and may be any other value.

Figure 16:
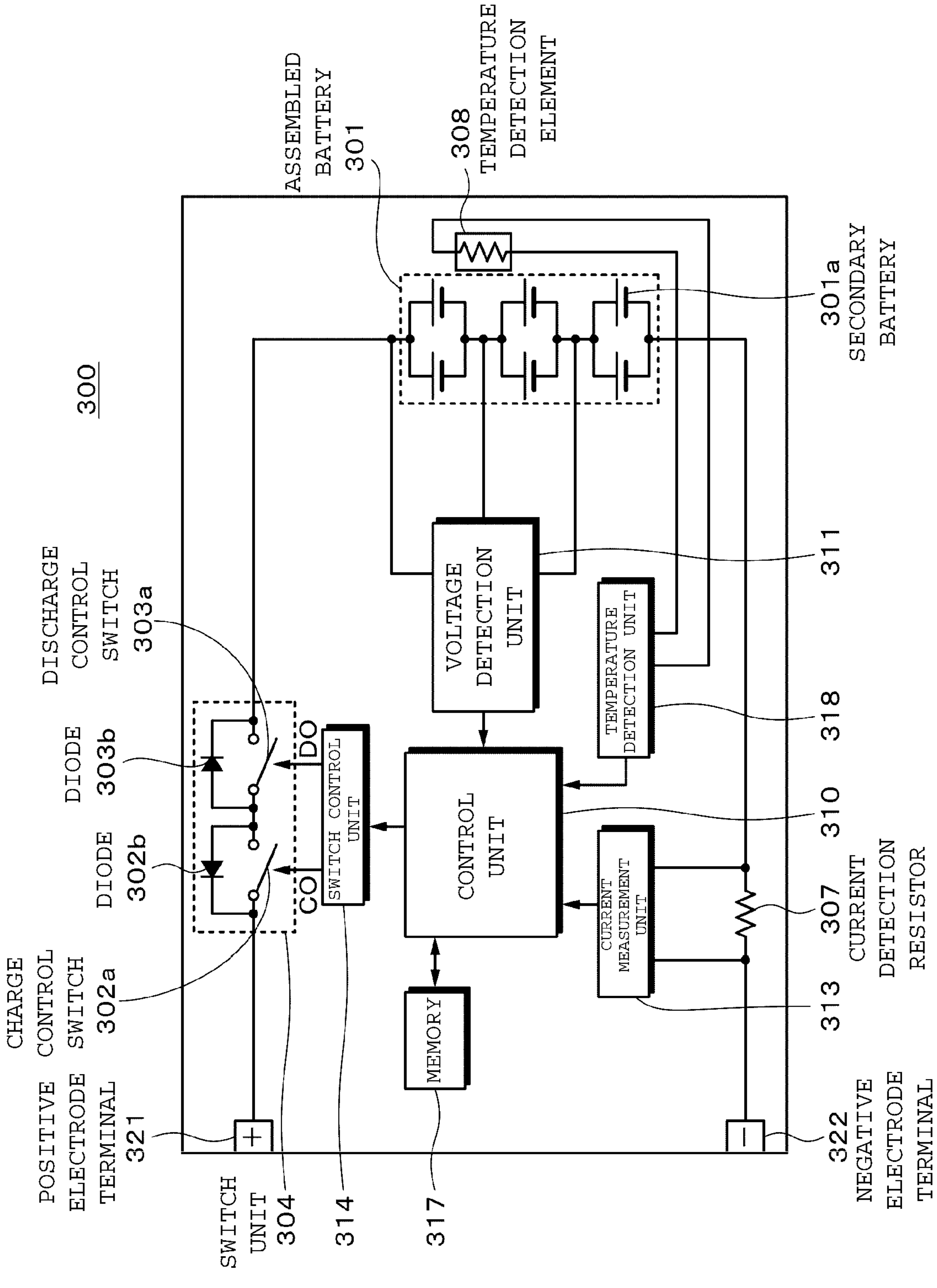
FIG. 16 is a connection diagram for use in description of a battery pack as an application example of the present application.

FIG. 16 is a block diagram illustrating a circuit configuration example in the case of applying the battery 1 to a battery pack 300 according to an embodiment. The battery pack 300 includes an assembled battery 301, a switch unit 304 including a charge control switch 302*a* and a discharge control switch 303*a*, a current detection resistor 307, a temperature detection element 308, and a control unit 310. The control unit 310 controls each device, and is further capable of performing charge/discharge control at the time of abnormal heat generation, and calculating and correcting the remaining capacity of the battery pack 300.

In the case of charging the battery pack 300, a positive electrode terminal 321 and a negative electrode terminal 322 are connected respectively to a positive electrode terminal and a negative electrode terminal of a charger to perform the charging. In addition in the case of using an electronic device connected to the battery pack 300, the positive electrode terminal 321 and the negative electrode terminal 322 are connected respectively to a positive electrode terminal and a negative electrode terminal of the electronic device to perform discharging.

The assembled battery 301 has a plurality of secondary batteries 301*a* connected in series and/or in parallel. FIG. 16 shows therein, as an example, a case where six secondary batteries 301*a* are connected so as to arrange two batteries in parallel and three batteries in series (2P3S), but any connection mode may be employed.

A temperature detection unit 318 is connected to the temperature detection element 308 (for example, a thermistor), for measuring the temperature of the assembled battery 301 or the battery pack 300, and then supplying the measured temperature to the control unit 310. The voltage detection unit 311 measures the voltages of the assembled battery 301 and of the secondary batteries 301*a* constituting the assembled battery, performs A/D conversion of the measured voltages, and supplies the converted voltages to the control unit 310. A current measurement unit 313 measures a current with the use of the current detection resistor 307, and supplies the measured current to the control unit 310.

The switch control unit 314 controls the charge control switch 302*a* and discharge control switch 303*a* of the switch unit 304, based on the voltages and current input from the voltage detection unit 311 and the current measurement unit 313. When the voltage of any of the secondary batteries 301*a* becomes equal to or lower than the overcharge detection voltage or the overdischarge detection voltage, or when a large current flows rapidly, the switch control unit 314 transmits an OFF control signal to the switch unit 304 to prevent overcharge, overdischarge, and overcurrent charge. In this regard, in the case where the secondary battery is a lithium ion secondary battery, the overcharge detection voltage is determined to be, for example, 4.20 V±0.05 V, and the overdischarge detection voltage is determined to be, for example, 2.4 V±0.1 V.

After the charge control switch 302*a* or the discharge control switch 303*a* is turned off, charge or discharge is allowed only through the diode 302*b* or the diode 303*b*. For the charge/discharge switch, a semiconductor switch such as a MOSFET can be used. In this case, the parasitic diode of the MOSFET functions as the diodes 302*b* and 303*b*. It is to be noted that the switch unit 304 is provided on the positive side in FIG. 16, but may be provided on the negative side.

A memory 317 includes a RAM and a ROM, and includes, for example, an EPROM (Erasable Programmable Read Only Memory) that is a nonvolatile memory. In the memory 317, the numerical value calculated by the control unit 310, the battery characteristics in the initial state for each secondary battery 301*a*, measured at the stage of the manufacturing process, and the like are stored in advance, and can be also appropriately rewritten. In addition, the full charge capacity of the secondary battery 301*a* is stored therein, thereby allowing the remaining capacity to be calculated in cooperation with the control unit 310.

The above-described battery 1 can be mounted on and used to supply electric power to electronic devices and electrical transportation devices, and devices such as electric storage devices according to an embodiment.

Examples of the electronic devices include lap-top computers, smartphones, tablet terminals, PDAs (personal digital assistants), mobile phones, wearable terminals, video movies, digital still cameras, electronic books, music players, headphones, game machines, pacemakers, hearing aids, electric tools, televisions, lighting devices, toys, medical devices, and robots. In addition, the electric transportation device, electric storage devices, electric tool, and electric unmanned aircraft as described later can also be included in the electronic devices in a broad sense.

Examples of the electrical transportation devices include electric automobiles (including hybrid automobiles), electric motorbikes, electric assist bicycles, electric buses, electric carts, automatic guided vehicles (AGVs) and railway vehicles. In addition, the examples also include electric passenger aircraft and electric unmanned aircraft for transportation. The secondary battery according to the present application is used not only as a driving power supply for the examples, but also as an auxiliary power supply, an energy regeneration power supply, and the like.

Examples of the electric storage devices include electric storage modules for commercial use or home use, and power supplies for power storage for architectural structures such as houses, buildings, and offices, or power generation facilities.

Figure 17:
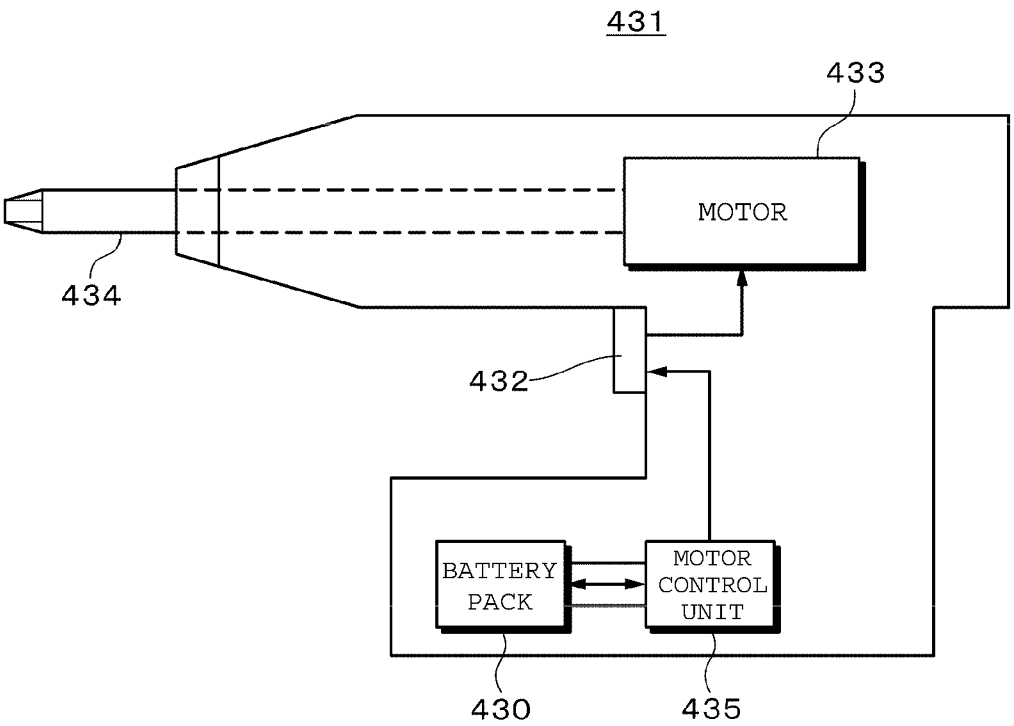
FIG. 17 is a connection diagram for use in description of an electric tool as an application example of the present application.

An example of an electric driver as a power tool will be schematically described with reference to FIG. 17 according to an embodiment. An electric driver 431 is provided with a motor 433 that transmits rotative power to a shaft 434 and a trigger switch 432 operated by a user. The rotation of the trigger switch 432 causes the shaft 434 to drive a screw or the like into a target object.

A battery pack 430 and a motor control unit 435 are housed in a lower housing of a handle of the electric driver 431. The battery pack 300 described above can be used as the battery pack 430. The battery pack 430 is built in the electric driver, or detachable from the electric driver 431. The battery pack 430 built in or removed from the electric driver 431 can be attached to a charging device.

Each of the battery pack 430 and the motor control unit 435 includes a microcomputer. Power is supplied from the battery pack 430 to the motor control unit 435, and information on charging and discharging the battery pack 430 is communicated between the microcomputers. The motor control unit 435 can control the rotation/stop and rotation direction of the motor 433, and further cut off the power supply to a load (such as the motor 433) at the time of overdischarge.

Figure 18:
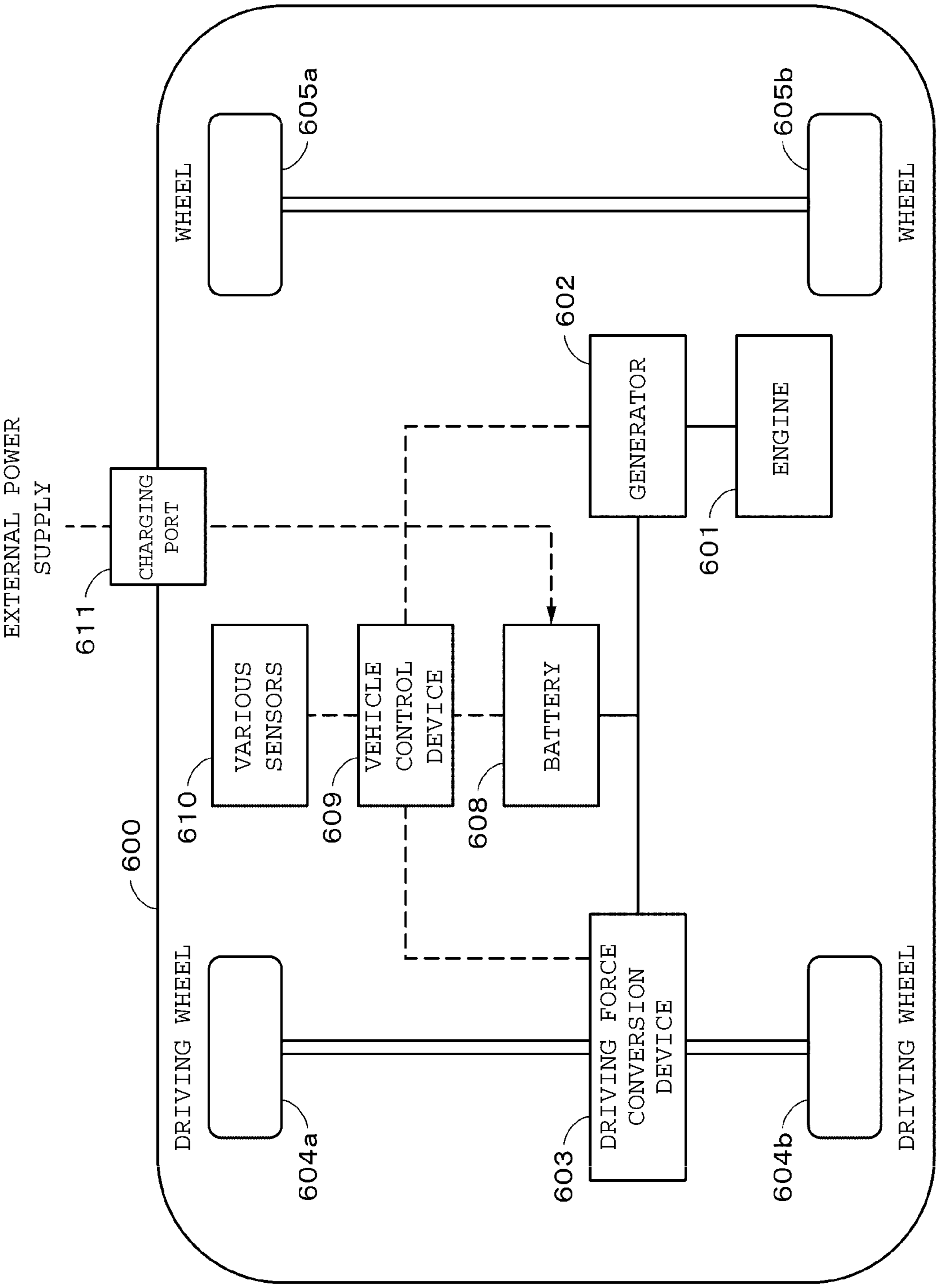
FIG. 18 is a connection diagram for use in description of an electric vehicle as an application example of the present application.

FIG. 18 schematically illustrates a configuration example of a hybrid vehicle (HV) that employs a series hybrid system, as an example of applying the present application to an electric storage system for an electric vehicle according to an embodiment. The series hybrid system is intended for a vehicle that runs on an electric power-driving force conversion device, with the use of electric power generated by a generator powered by an engine, or the electric power stored once in the battery.

The hybrid vehicle 600 carries an engine 601, a generator 602, the electric power-driving force conversion device 603 (direct-current motor or alternate-current motor, hereinafter referred to simply as a "motor 603"), a driving wheel 604*a*, a driving wheel 604*b*, a wheel 605*a*, a wheel 605*b*, a battery 608, a vehicle control device 609, various sensors 610, and a charging port 611. To the battery 608, the above-described battery pack 300 or an electric storage module mounted with a plurality of batteries 1 can be applied according to an embodiment. The secondary battery has a cylindrical shape, a rectangular shape, or a laminate shape.

The motor 603 is operated by the electric power of the battery 608, and the torque of the motor 603 is transmitted to the driving wheels 604*a* and 604*b*. The torque of the engine 601 is transmitted to the generator 602, and the torque makes it possible to reserve, in the battery 608, the electric power generated by the generator 602. The various sensors 610 control the engine rotation speed via the vehicle control device 609, and control the position of a throttle valve, not shown. The various sensors 610 include a speed sensor, an acceleration sensor, an engine rotation speed sensor, and the like.

When the hybrid vehicle 600 is decelerated by a braking mechanism, not shown, the resistance force during the deceleration is applied as torque to the motor 603, and the regenerative electric power generated by the torque is reserved in the battery 608. In addition, although not shown, the vehicle may be provided with an information processing device (for example, a remaining battery life display) that performs information processing related to vehicle control, based on information on the secondary battery. The battery 608 can be powered and charged by being connected to an external power supply through the charging port 611 of the hybrid vehicle 600. Such an HV vehicle is referred to as a plug-in hybrid vehicle (PHV or PHEV).

Although the series hybrid vehicle has been described above as an example, the present invention can be also applied to a parallel system in which an engine and a motor are used in combination or a hybrid vehicle in which a series system and a parallel system are combined. Furthermore, the present invention can be also applied to electric vehicles (EVs or BEVs) that run on driving by only a driving motor without using any engine, and fuel cell vehicles (FCVs).

DESCRIPTION OF REFERENCE SYMBOLS

1: Lithium ion battery
12, 13: Insulating plate
20: Electrode wound body
21: Positive electrode
22: Negative electrode
23: Separator
24: Center pin
25: Positive electrode lead
26: Negative electrode lead
31, 32: Foil tab
33, 34: Comb-teeth part
35, 36: Plate-shaped part
41, 42, 42A, 42B: Connection It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising an electrode wound body housed in a battery can, the electrode wound body having a structure comprising a band-shaped positive electrode and a band-shaped negative electrode laminated and wound with a separator interposed therebetween, wherein the positive electrode comprises a positive electrode active material layer on both sides of a band-shaped positive electrode foil, the negative electrode comprises a negative electrode active material layer on both sides of a band-shaped negative electrode foil, the electrode wound body comprises a positive electrode tab at a central part of the positive electrode, a negative electrode tab on a winding end side of the negative electrode, and a foil tab in a flat plate shape on a winding start side of either one or both of the positive electrode and the negative electrode, the foil tab comprises a plate-shaped part joined on the winding start side of the positive electrode or the negative electrode, and a comb-teeth part protruded from the positive electrode or the negative electrode, and the comb-teeth part is provided as connection of the electrode wound body, wherein intervals between strip-shaped protrusions of the comb-teeth part are gradually increased from the winding start side.

2. The secondary battery according to claim 1, wherein a material of the foil tab of the negative electrode is any of copper, a copper-nickel alloy, nickel, zinc, a copper-zinc alloy, and a copper-zinc-nickel alloy, or a composite material thereof.

3. The secondary battery according to claim 1, wherein a material of the foil tab of the positive electrode is any of aluminum, titanium, and stainless steel (SUS), or a composite material thereof.

4. The secondary battery according to claim 1, wherein the foil tab of the positive electrode or the foil tab of the negative electrode is 0.020 mm or more and 0.100 mm or less in thickness.

5. The secondary battery according to claim 1, wherein the foil tab of the positive electrode or the foil tab of the negative electrode has one turn or more and 2.5 turns or less in number of turns.

6. The secondary battery according to claim 1, wherein a content of a silicon oxide included in the negative electrode active material layer is 5 wt % or more and 20 wt % or less.

7. An electronic device comprising the secondary battery according to claim 1.

8. An electric tool comprising the secondary battery according to claim 1.

9. A secondary battery comprising an electrode wound body housed in a battery can, the electrode wound body having a structure comprising a band-shaped positive electrode and a band-shaped negative electrode laminated and wound with a separator interposed therebetween, wherein the positive electrode comprises a positive electrode active material layer on both sides of a band-shaped positive electrode foil, the negative electrode comprises a negative electrode active material layer on both sides of a band-shaped negative electrode foil, the electrode wound body comprises a positive electrode tab at a central part of the positive electrode, a negative electrode tab on a winding end side of the negative electrode, and a foil tab in a flat plate shape on a winding start side of either one or both of the positive electrode and the negative electrode, the foil tab comprises a plate-shaped part joined on the winding start side of the positive electrode or the negative electrode, and a comb-teeth part protruded from the positive electrode or the negative electrode, and the comb-teeth part is provided as connection of the electrode wound body, wherein the foil tab of the positive electrode or the foil tab of the negative electrode has one turn or more and 2.5 turns or less in number of turns.

10. The secondary battery according to claim 9, wherein intervals between strip-shaped protrusions of the comb-teeth part are gradually increased from the winding start side.

11. The secondary battery according to claim 9, wherein a material of the foil tab of the negative electrode is any of copper, a copper-nickel alloy, nickel, zinc, a copper-zinc alloy, and a copper-zinc-nickel alloy, or a composite material thereof.

12. The secondary battery according to claim 9, wherein a material of the foil tab of the positive electrode is any of aluminum, titanium, and stainless steel (SUS), or a composite material thereof.

13. The secondary battery according to claim 9, wherein the foil tab of the positive electrode or the foil tab of the negative electrode is 0.020 mm or more and 0.100 mm or less in thickness.

14. The secondary battery according to claim 9, wherein a content of a silicon oxide included in the negative electrode active material layer is 5 wt % or more and 20 wt % or less.

15. An electronic device comprising the secondary battery according to claim 9.

16. An electric tool comprising the secondary battery according to claim 1.

* * * * *